(12) United States Patent
Wingert et al.

(10) Patent No.: US 8,194,859 B2
(45) Date of Patent: Jun. 5, 2012

(54) EFFICIENT KEY HIERARCHY FOR DELIVERY OF MULTIMEDIA CONTENT

(75) Inventors: Christopher R. Wingert, Del Mar, CA (US); Pooja Aggarwal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1194 days.

(21) Appl. No.: 11/511,736

(22) Filed: Aug. 28, 2006

(65) Prior Publication Data

US 2007/0206799 A1 Sep. 6, 2007

Related U.S. Application Data

(60) Provisional application No. 60/714,153, filed on Sep. 1, 2005.

(51) Int. Cl.
*H04L 9/00* (2006.01)
(52) U.S. Cl. .................................. 380/286; 713/193
(58) Field of Classification Search .............. 380/285, 380/286; 705/59; 713/189, 193, 168; 726/26
See application file for complete search history.

(56) References Cited

U.S. PATENT DOCUMENTS

| | | | |
|---|---|---|---|
| 5,557,346 A * | 9/1996 | Lipner et al. .................. | 380/286 |
| 6,330,670 B1 * | 12/2001 | England et al. .................. | 713/2 |
| 6,681,017 B1 * | 1/2004 | Matias et al. .................. | 380/277 |
| 7,010,808 B1 * | 3/2006 | Leung et al. .................. | 726/26 |
| 2001/0052077 A1 * | 12/2001 | Fung et al. .................. | 713/184 |
| 2003/0163691 A1 * | 8/2003 | Johnson .................. | 713/168 |
| 2003/0233561 A1 | 12/2003 | Ganesan et al. | |
| 2004/0093494 A1 | 5/2004 | Nishimoto et al. | |
| 2004/0162786 A1 * | 8/2004 | Cross et al. .................. | 705/59 |
| 2005/0273629 A1 * | 12/2005 | Abrams et al. .................. | 713/189 |
| 2006/0178918 A1 * | 8/2006 | Mikurak .................. | 705/7 |

FOREIGN PATENT DOCUMENTS

| | | |
|---|---|---|
| EP | 1335266 | 8/2003 |
| EP | 1452941 | 9/2004 |
| JP | 9097295 | 4/1997 |
| JP | 10320478 | 12/1998 |
| JP | 2002149061 | 5/2002 |
| JP | 2002279102 | 9/2002 |
| JP | 2003152698 A | 5/2003 |
| JP | 2004046833 | 2/2004 |
| JP | 2004133654 | 4/2004 |
| JP | 2004259280 | 9/2004 |
| JP | 2005006033 | 1/2005 |
| KR | 20040073356 A | 8/2004 |

OTHER PUBLICATIONS

International Search Report and Written Opinion—PCT/US2006/034368, International Search Authority —European Patent Office —Mailed Mar. 29, 2007. Translation of Office Action in Japan application 2008-529345 corresponding to U.S. Appl. No. 11/511,736, citing JP2005006033, JP2002279102, JP2004046833, JP2004259280, JP2004133654, JP2002149061, JP10320478 and JP9097295 dated Jan. 25, 2011 (040356JP).
European Search Report—EP11172663—Search Authority—Munich—Oct. 13, 2011 (040356EPD1).

* cited by examiner

*Primary Examiner* — Beemnet Dada
(74) *Attorney, Agent, or Firm* — Gerald P. Joyce, III

(57) ABSTRACT

A Digital Rights Management (DRM) system provides a lightweight layering of encryption and decryption of keys that allows efficient use of different cryptographic techniques to effect the secure delivery of multimedia content. Asymmetric cryptography, where a public key is used to encrypt information that can only be decrypted by a matched private key, is used by the DRM system to deliver symmetric keys securely.

35 Claims, 16 Drawing Sheets

EFFICIENT KEY HIERARCHY FOR DELIVERY OF MULTIMEDIA CONTENT

CROSS-REFERENCE

This application claims the benefit of U.S. Provisional Application Ser. No. 60/714,153, filed Sep. 1, 2005, entitled "EFFICIENT KEY HIERARCHY FOR DELIVERY OF MULTIMEDIA CONTENT," the entirety of which is incorporated herein by reference.

BACKGROUND

I. Field

The following description relates generally to digital rights management and more particularly to an efficient key hierarchy for delivery of multimedia content.

II. Background

As Third Generation (3G) mobile systems and other cellular networks are deployed, new Internet Protocol (IP) packet data based services are emerging. A service area that network operators are seeking to exploit involves the distribution of video content to the mass market. High-quality video is a type of data-intensive content. Consumer experience with home viewing options provides network operators and content providers with target markets that have predefined user expectations. These user expectations combined with mobility, attractive business models, network control and management, access control, and device capabilities present complex challenges to network operators and content providers.

Protection of distributed content is a challenge that has arisen to guard against unauthorized copying and to control, either directly or indirectly, the content distribution. Content providers typically require that a content distribution system have the ability to provide Digital Rights Management (DRM), which refers to any of several technical arrangements that provide control for the user of distributed material on electronic devices with such measures installed. An underlying component for content distribution systems is the feature of encryption/decryption of media during transmission/receipt, such as in a subscription-based content distributions service. DRM software can provide the underlying encryption/decryption algorithms, hashing and authentication algorithm implementations used on both the client and the server portions. DRM can also provide license download and secure file-storage features for the client.

Two types of cryptosystems or cryptography techniques that may be utilized in DRM systems are symmetric cryptography and asymmetric cryptography. In symmetric key cryptography, the same key is used for both encryption and decryption. Examples of symmetric key cryptography include Data Encryption Standard (DES) and Advanced Encryption Standard (AES) systems. In asymmetric cryptography, also known as public-key cryptography, each user has a public key and a private key. Encryption is performed with the public key while decryption is performed with the private key. Examples of asymmetric cryptography include the Rivest, Shamir and Adleman (RSA) algorithm and Elliptic Curve Cryptography (ECC). Symmetric key cryptography is fast compared to asymmetric key cryptography, but it suffers from the drawback of having to communicate the shared keys secretly to the communicating entities. Asymmetric cryptography, as its name implies, unevenly divides processing demands based on the use of the public and private keys.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with efficient key hierarchy for delivery of multimedia content. Two types of cryptographic techniques (e.g., symmetric and asymmetric cryptography) are utilized for authentication, key, and content protection. According to some embodiments, a method for performing digital rights management for a plurality of content on a client device is provided. The method includes generating an asymmetric key pair that comprises a public portion and a private portion and transmitting the public portion of the asymmetric key pair. The method also includes receiving a first symmetric key and a second symmetric key. The first symmetric key can be encrypted using the public portion of the asymmetric key pair and the second symmetric key is associated with a plurality of content.

In accordance with some embodiments is an apparatus that facilitates digital rights management. The apparatus includes a processor that executes instructions for generating an asymmetric key pair and selectively transmits at least a first portion of the asymmetric key pair to a server. A memory that stores information related to at least a second portion of the asymmetric key pair generated by the processor is also included in the apparatus.

According to some embodiments is an apparatus that facilitates data rights management of multimedia content. The apparatus includes a means for generating a public key and a private key and a means for communicating the public key to a subscription server with a request for a license file. Also included in the apparatus are a means for receiving the requested license file and a means for decrypting a multimedia content based in part on header information contained in the license file.

In accordance with some embodiments is a computer-readable medium having stored thereon computer-executable instructions for digital rights management. The instructions include generating an asymmetric key pair and sending at least a first portion of the asymmetric key pair and a request for access to multimedia content to a server. The instructions further include receiving a license file that includes symmetric keys and access information relating to the multimedia content and decrypting the access information to render the multimedia content on a display.

According to some embodiments is a processor that executes computer-executable instructions for key hierarchy for delivery of multimedia content. The instructions include generating a key pair that comprises a public key and a private key and transmitting the public key to fetch a license file from a subscription server. The instructions further include receiving license file information that includes header information and at least one symmetric key and decrypting a program based in part on the header information.

According to some embodiments is a method for performing digital rights management on a server for a plurality of content. The method includes receiving a public portion of an asymmetric key pair from a client. A first symmetric key is encrypted using a second symmetric key and is associated with a plurality of content. The second symmetric key is encrypted using the public portion of the asymmetric key pair.

In accordance with some embodiments is an apparatus that facilities delivery of multimedia content. The apparatus includes a processor that executes instructions for generating an encrypted first symmetric key and at least a second encrypted symmetric key associated with a request for delivery of multimedia content. The apparatus also includes a memory that stores information related to at least one of the first symmetric key and the at least a second symmetric key generated by the processor.

According to some embodiments is an apparatus that facilitates creation of a key hierarchy for delivery of content. The apparatus includes a means for receiving at least a portion of an asymmetric key pair from a client. Also included is a means for creating a first symmetric key and at least a second symmetric key. There is also a means for utilizing the first symmetric key to encrypt the at least a second symmetric key and a means for encrypting the second symmetric key with the at least a portion of the asymmetric key pair.

In accordance with some embodiments is a computer-readable medium having stored thereon computer-executable instructions for digital rights management. The instructions include accepting a request for access to multimedia content, the request comprising at least a portion of an asymmetric key pair. A first and at least a second symmetric key are created and the first symmetric key is encrypted with the second symmetric key pair. The instructions further include associating the second symmetric key pair with the multimedia content and sending the first symmetric key and the second symmetric key to a client.

According to some embodiments is a processor that executes computer-executable instructions for digital rights management. The instructions include generating an encrypted session key for a requested license file and creating at least one encrypted service key associated with subscribed services. The instructions further include creating at least one encrypted session key with a client encryption key and storing the encrypted service key and the at least one encrypted session key in the requested license file.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

GLOSSARY OF TERMS

Figure 1:
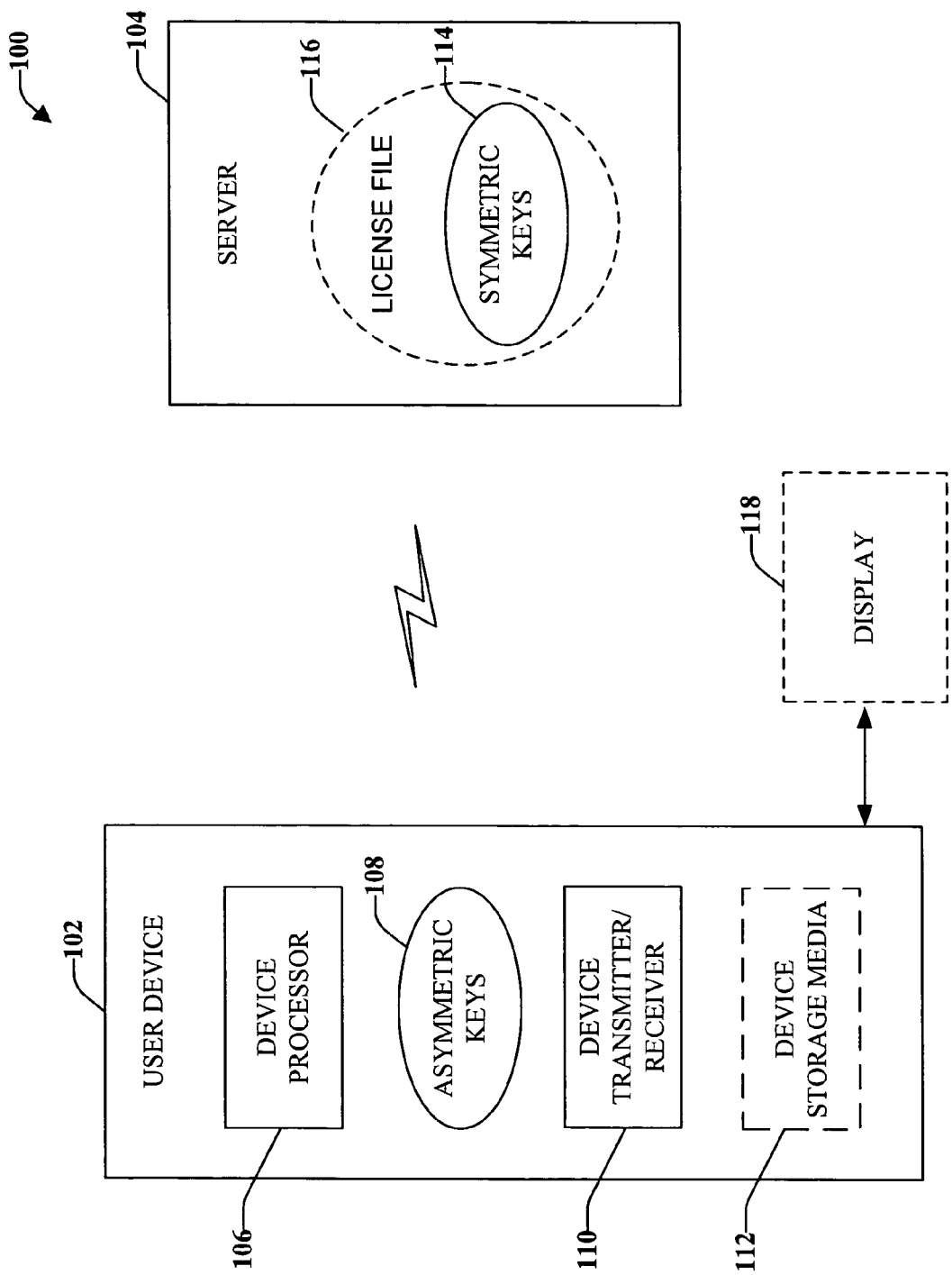
FIG. 1 illustrates a block diagram of a system for an efficient key hierarchy for delivery of multimedia content.

Service Key $K_{Service}$=A key used to encrypt Program Keys $K_{Program}$. Service Keys $K_{Service}$ map to a specific service (e.g., CNN, MSNBC). Key Type: Symmetric.

Program Key $K_{Program}$=A key used to encrypt the video and audio data of a program. Program Keys $K_{Program}$ map to specific programs (e.g., television programs). Key Type: Symmetric.

Session Key $K_{Session}$=A key used in a temporal manner to symmetrically encrypt data. A Session Key $K_{Session}$ is used to encrypt Service Keys $K_{Service}$ in a License file. Key Type: Symmetric.

Client Encryption Key $E_{Device}$=The public portion of the Client encryption key. This key may be distributed to any device wanting to deliver a message to the Client. Key Type: Asymmetric.

Client Decryption Key $D_{Device}$=The private portion of the Client encryption key. This key remains a secret to the Client. Key Type: Asymmetric.

Authentication Key $Q_{Device}$=Authentication key used during Client—Server communications to authenticate each end. Key Type: keyed-Hashed Message Authentication Code.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

With reference now to the drawings, FIG. 1 illustrates a block diagram of a system 100 for an efficient key hierarchy for delivery of multimedia content. The various embodiments described herein provide a lightweight layering of encryption and decryption keys that provides for the efficient use of different cryptographic techniques to affect the secure delivery of multimedia content. The layering, or, hierarchy, is based on a user key encrypting a first symmetric key, which in turn encrypts a service key. The service key is used to encrypt a program key, which ultimately encrypts multimedia content.

In some embodiments, asymmetric cryptography, where a public key is used to encrypt information that can only be decrypted by a matched private key, is used to deliver symmetric keys securely. However, because of the processing differences between the two algorithms, where symmetric cryptography is computationally faster than asymmetric cryptography, once the symmetric keys are transferred symmetric cryptography is used to perform most of the encryption/decryption.

In accordance with some embodiments, symmetric cryptography is used to verify the authenticity of messages. Specifically, Hash Message Authentication Code-Secure Hash Algorithm 1 (HMAC-SHA1) can be utilized for message signing and verification. Hashing can also be used in conjunction with keys to authenticate the entities in the system 100. A hash algorithm takes as input an arbitrary length message and returns a fixed length hash value. A secure hash algorithm, which is a hash algorithm that implements a one-way function that converts the message to the fixed length value in a fashion such that the message is not easily reversible (e.g., it is not easy to go back from the hash value to the original message) is used. Further, the hashing technique used should have an extremely low probability of collisions (e.g., two different messages should not generate the same hash value). Hashing can be used in conjunction with keys to authenticate entities.

Hashing can be used with asymmetric cryptography to create Digital Signatures, which verify that an entity with the secret portion of the key encrypted a message hash and that the message was not tampered in transit. Another form of signature can be carried out with a symmetric key, such as a Message Authentication Code (MAC). A MAC can be computed with a secret key shared between sender and receiver.

System 100 can be, for example, a MediaFLO System that takes as input service content and outputs the content to a multitude of users. As discussed herein, a MediaFLO System can use both symmetric and asymmetric cryptography to protect secrets in the system. Generally, asymmetric cryptography can be used to deliver symmetric keys securely because of the processing differences between the two algorithms. Symmetric cryptography can be used to perform the bulk of the encryption/decryption. Asymmetric cryptography can be used for message authentication.

System 100 may be included in a client or user device 102 that can be a mobile device, such as a cellular phone, smart phone, laptop, handheld communication device, handheld computing devices, satellite radios, global positioning system, Personal Digital Assistants (PDA), and/or other suitable devices for communicating over a wireless communication network. The user device 102 can communicate wirelessly with a license management server 104. Although a number of user devices(s) 102 and servers(s) 104 can be included in a communication network, as will be appreciated, a single user device 102 that transmits communication data signals with a single server 104 is illustrated for purposes of simplicity.

User device 102 can include a processor 106 that can be configured to generate a key pair 108, such as an asymmetric key pair. The key pair 108 can include a public portion and a private portion. The asymmetric key pair can be generated during an activation process, for example, which will be discussed in more detail below. The public portion of the key pair 108 can be transmitted (e.g., wirelessly), by transmitter/receiver 110 to server 104 to obtain digital rights to a multimedia content and/or to fetch a license file from a license server 104. Digital rights can describe how the content may be used on a device. For example, the Digital rights associated with the content may restrict just viewing of the content, viewing of the content for a specified number of timers, permissible saving on the content, time(s) when the content can be viewed, and so forth. It should be understood that although a transmitter/receiver is illustrated as one component, it could be configured with two or more components.

If user device 102 is authorized to obtain the multimedia content, server can respond with one or more symmetric keys 114, which can be received by device's transmitter/receiver 110. A storage media 112 can be configured to maintain information associated with the asymmetric keys 108, the symmetric keys 114, or both types of keys in a retrievable format. For example, a first symmetric key received at user device 102 can be encrypted using the public portion of the key pair 108. In some embodiments, the first symmetric key can be encrypted with a decryption scheme that can be associated with a validation period after which the key is rendered inactive (or another deactivation scheme). A second symmetric key received can be associated with a plurality of content (e.g., multimedia content). In some embodiments, the second symmetric key can be encrypted with the first symmetric key.

Processor 110 can be configured to decrypt the symmetric keys. For example, the first symmetric key can be decrypted utilizing the private portion of the asymmetric key pair 108. In accordance with some embodiments, the first and second symmetric keys 114 are included in a license file 116. In such embodiments, processor 110 can be configured to retrieve the second symmetric key from the license file and decrypt it based on the first symmetric key using symmetric cryptography. A display 118 can be associated with user device 102 and decrypting the program can be performed at substantially the same time as media is rendered on a display.

In accordance with some embodiments, a third symmetric key can be provided by server 104 and can be associated with a first content in the multitude of multimedia content and the second symmetric key. The processor 110 can be configured to decrypt the third symmetric key utilizing the second symmetric key and to decrypt the first content from the multitude of content associated with the third symmetric key. In some embodiments, the third symmetric key can be encrypted (and decrypted) with the first symmetric key.

In addition or alternatively, receiver 110 can be configured to receive license file 116 information that includes header information (e.g., User ID, EpochID). The license file 116 may also include an encrypted session key and at least one service key. The encrypted service key can be stored in a retrievable format in a storage media 112. Processor 110 can be configured to decrypt a program or multimedia content based in part on the header information received in license file 116. The decryption can occur, in accordance with some embodiments, at substantially the same time as the program or multimedia content is rendered on display 118.

Any reference to memory, storage, database, or other medium as used herein can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Figure 2:
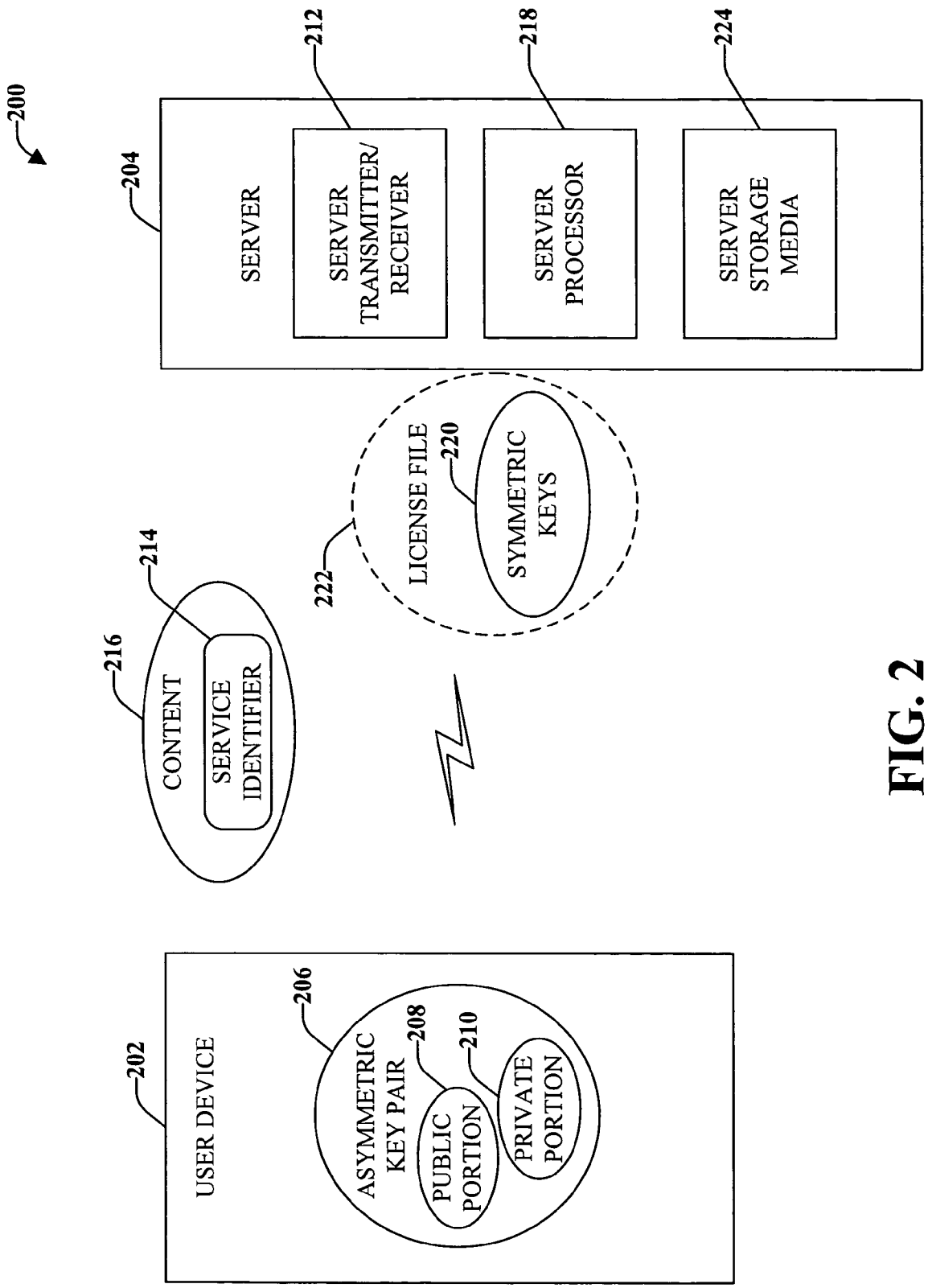
FIG. 2 illustrates another block diagram of a system for an efficient key hierarchy for delivery of multimedia content.

FIG. 2 illustrates another block diagram of a system 200 for an efficient key hierarchy for delivery of multimedia content. System includes one or more clients or user devices 202 (e.g., mobile device) and one or more servers 204, which can be a license server or an authentication device. User device 202 can be configured to generate an asymmetric key pair 206, which can include a private portion 208 and a public portion 210. The public portion 210 of the key pair 206 can be transmitted to server 204 to obtain rights to multimedia content on user device 202 to which a user of user device 202 has subscribed.

Server 204 can be configured to receive public portion 210 from user device 202, such as by a receiver 212 (shown as a transmitter/receiver 212 pair). Server 204 can also be configured to receive or request (from user device 202 or another source at least one service identifier 214 that can be associated with content 216 subscribed to by user of user device 202.

A processor 218 associated with server 204 can be configured to generate various symmetric keys that can be utilized by user device 202 to obtain access to multimedia content. For example, processor 218 can generate a first and a second symmetric key 220 and encrypt the first symmetric with the second symmetric key. The second symmetric key can be encrypted using the public portion 208 of the asymmetric key pair 206. In accordance with some embodiments, the first symmetric key is associated with content 216 subscribed to by a user. To encrypt the first symmetric key, processor 218 can be configured to retrieve one or more service identifiers 214 associated with content 216 subscribed to by user and the second symmetric key based on the retrieved one or more service identifiers 214. In accordance with some embodiments, client can be authenticated by server 204 or another device before encryption of the symmetric keys. Symmetric keys 220 can be communicated to user device by transmitter 212.

In accordance with some embodiments, server 204 receives a request for a license file 222 from user device 202. The request can included a client encryption key 208 and a list of subscribed services 214. Processor 218 can be configured to generated an encrypted session key 220 associated with the subscribed services 214 (by symmetric cryptography) and an encrypted session key 220 that is encrypted with the client encryption key 208 (by asymmetric cryptography). A storage media 224 associated with server 204 (or processor 218) can store or maintain the encrypted service key and the at least one encrypted session key in the requested license file 222. The license file 222 can be sent to the authenticated user device 202.

Figure 3:
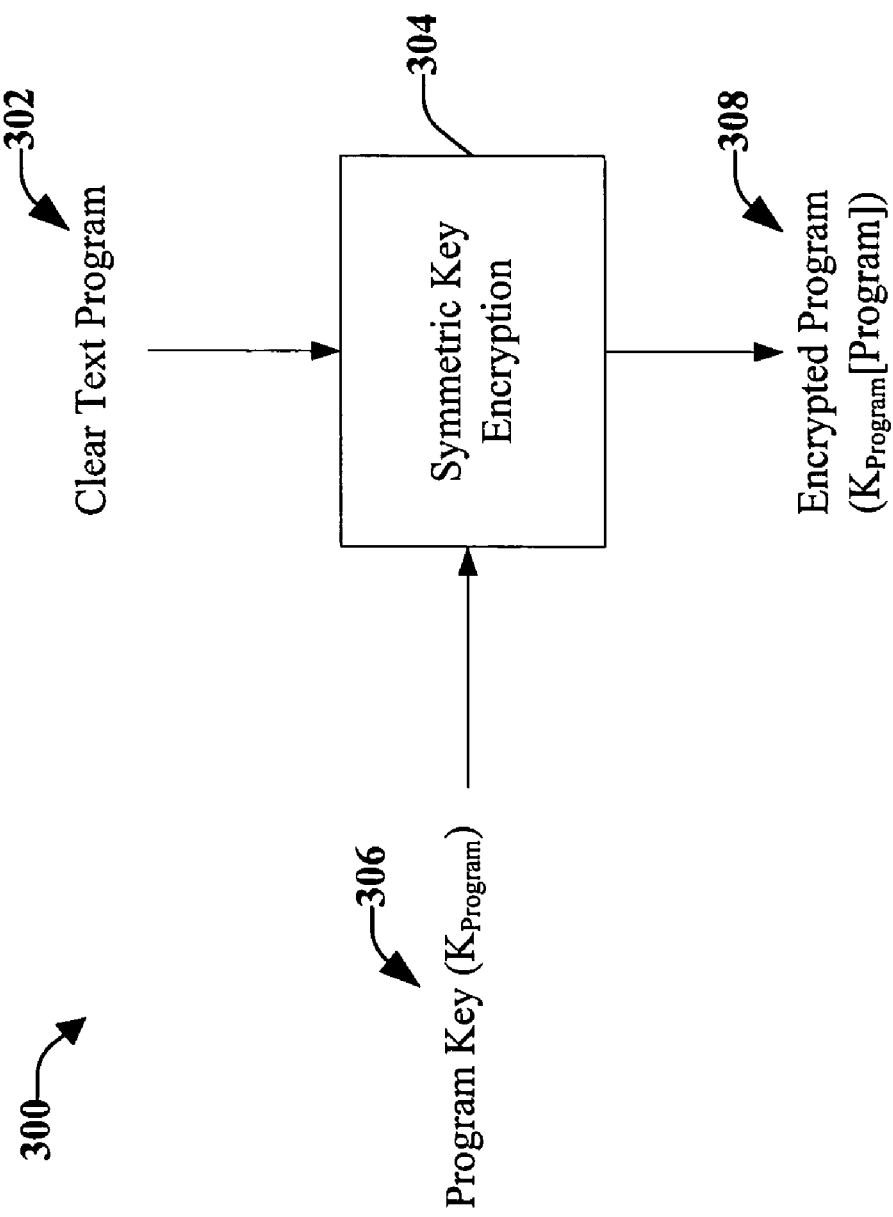
FIG. 3 illustrates an encryption of multimedia content using a program key.

FIG. 3 illustrates an encryption 300 of multimedia content using a program key. The multimedia content for a specific program (cleartext program 302) is encrypted using symmetric cryptography using symmetric key encryption 304 by a Program Key $K_{Program}$ 306. Cleartext is the name given to data before a cipher operation is applied to it and ciphertext is the name given to data after a cipher operation has been applied. The Program Key $K_{Program}$ 306 is itself encrypted by Service Key $K_{Service}$ (not shown) and the encrypted Program Key $K_{Program}$ 306 is delivered along with the program $K_{Program}$[Program] 308. The programming can include a metadata portion and a content portion. The content portion is encrypted by the Program Key $K_{Program}$ 306. The metadata portion of the programming, which includes information about the content portion (e.g., digital representation of the content, the security or rights management information, and so on), includes the encrypted Program Key $K_{Program}$ 306.

Figure 4:
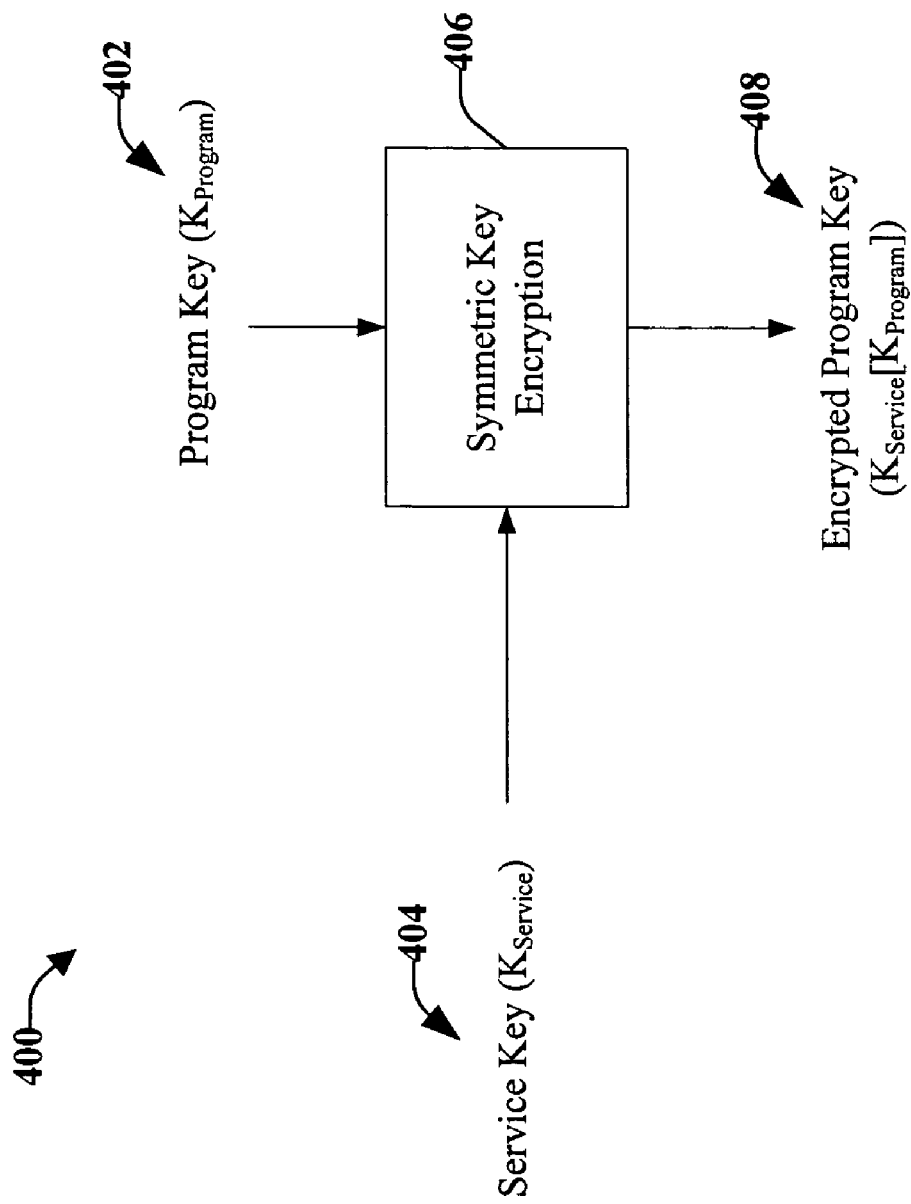
FIG. 4 illustrates an encryption of the program key using a service key.

With reference now to FIG. 4 illustrated is an encryption 400 of the program key using a service key. The Program Key $K_{Program}$ 402 is encrypted by a respective Service Key $K_{Service}$ 404 using symmetric key encryption 406. This produces an Encrypted Program Key ($K_{Service}[K_{Program}]$) 408. By protecting each Program Key $K_{Program}$ 402 using its respective Service Key $K_{Service}$ 404, a single program can be reused for different services and the Program Keys used to encrypt the program for the different services are the only data that should be duplicated.

For exemplary purposes and not limitation, a first user "A" subscribes to the ESPN service, and a second user "B" subscribes to both the CNN service and the ESPN service. A program that is to be "aired" on both services, for example a commercial advertisement (Ad) program, is encrypted using an Ad Program Key $K_{ProgramAd}$ to create an encrypted Ad program $K_{programAd}$(Ad Program). The Ad Program Key $K_{programAd}$ is encrypted by an ESPN Service Key $K_{ServiceESPN}$ to create an ESPN service encrypted Ad Program Key $K_{ServiceESPN}(K_{ProgramAd})$. The Ad Program Key $K_{programAd}$ is also encrypted by a CNN Service Key $K_{ServiceCNN}$ to create a CNN service encrypted Ad Program Key $K_{ServiceCNN}(K_{ProgamAd})$. The ESPN service encrypted Ad Program Key $K_{ServiceESPN}(K_{programAd})$ is distributed to the first user A and the second user B along with encrypted Ad Program $K_{programAd}$(Ad Program). The first user A and the second user B can access the Ad Program in the ESPN service after the $K_{ProgramAd}$ is retrieved by using the ESPN Service Key $K_{ServiceESPN}$. However, because the same key ($K_{ProgramAd}$) is used to encrypt the Ad program, the Ad program is also accessible by the second user B through the CNN service without having to distribute another copy of the encrypted Ad program for the CNN service $K_{ProgramAd}$(Ad Program). Only the CNN service encrypted Ad Program Key $K_{ServiceCNN}$ ($K_{ProgramAd}$) should be distributed. Thus, the Ad Program can be decrypted second user B whether the user is accessing the ESPN service (by retrieving/decrypting the Ad Program Key $K_{ProgramAd}$ from the ESPN service encrypted Ad Program Key $K_{ServiceESPN}(K_{ProgramAd})$), or the CNN service (by retrieving/decrypting the Ad Program Key $K_{ProgramAd}$ from the CNN service encrypted Ad Program Key $K_{ServiceCNN}$ ($K_{ProgramAd}$)).

Figure 5:
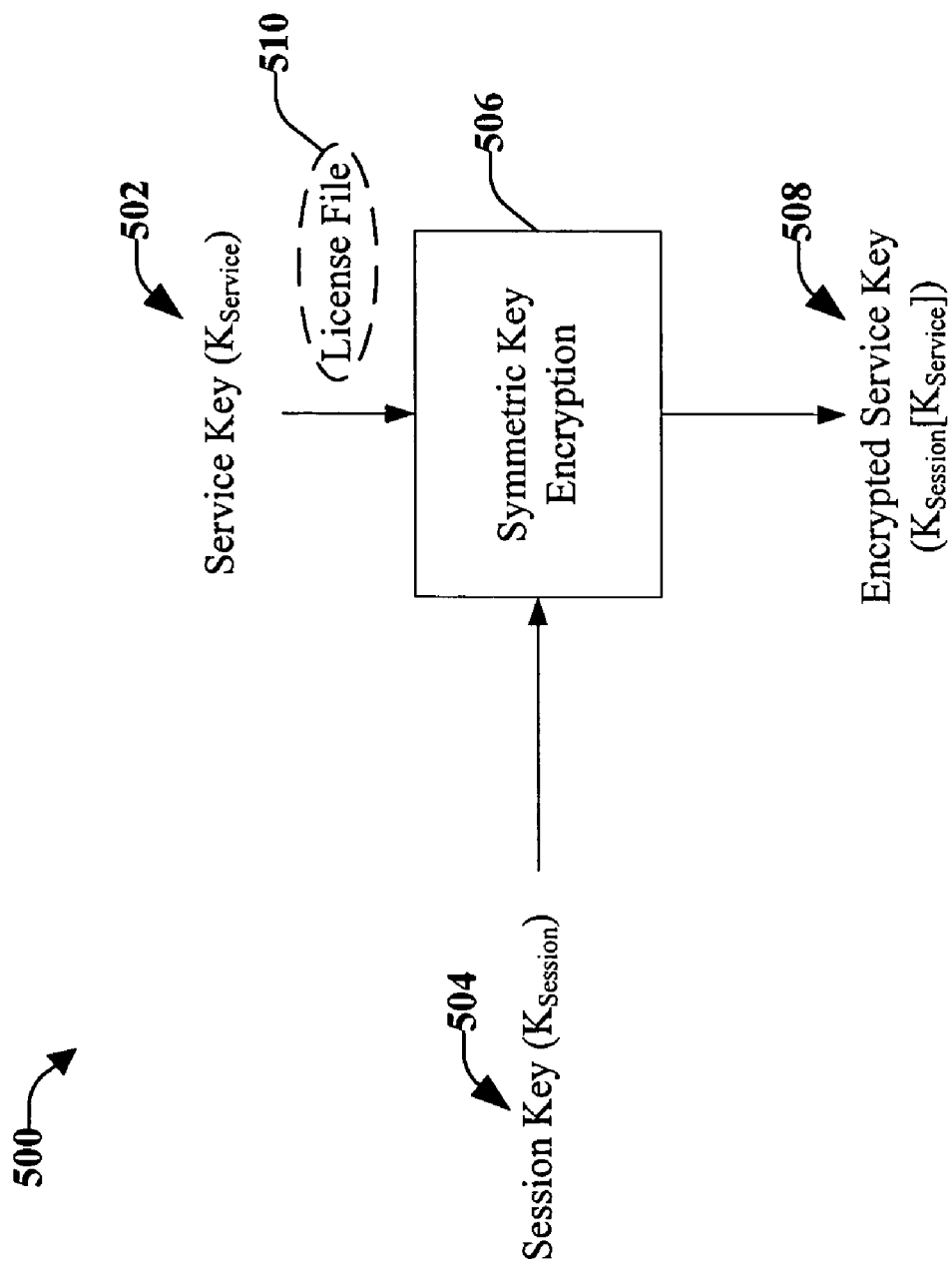
FIG. 5 illustrates an encryption of the service key using a session key.

FIG. 5 illustrates an encryption 500 of the service key using a session key. The Service Key $K_{Service}$ 502 is encrypted by the Session Key $K_{Session}$ 504 using symmetric key encryption 506 to create an Encrypted Service Key ($K_{Session}[K_{Service}]$) 508. In some embodiments, the Session Key $K_{Session}$ 504 covers multiple Service Keys $K_{Service}$ 502, where the multiple Service Keys $K_{Service}$ 502 are delivered in a License File 510. Thus, the service provided to a particular user, which can be based on the services subscribed to by the user, is defined by the License File 510. In addition, each License File 510 and the Service Keys $K_{Service}$ 502 in the License File 510 can be valid for some predetermined time period, which can be referred to as an "Epoch." After such predetermined time period, the License File 510 and the Service Keys $K_{Service}$ 502 in the License File 510 are expired or rendered invalid. The expiration of such keys can contain or mitigate system damage that may be a result of a key become known to an unauthorized user. Service Keys for a given epoch should be removed from the device after the expiration time of content for which a viewing time has been defined in a given epoch.

Although Service Keys $K_{Service}$ may be encrypted by asymmetric encryption using Client Encryption Key $E_{Device}$, this method of encryption (and its associated method of decryption) can be slow. Thus, a Session Key $K_{Session}$ can be created for each Client/License/Epoch and only the Session Key $K_{Session}$ is protected using asymmetric cryptography. For decryption of the Service Keys $K_{Service}$ to be fast on the Client so that the presentation of the "channels" that is being selected by the user is fast (e.g., the decryption of the particular program key needed to decrypt the program associated with the service selected by the user as the user is "channel surfing" should be fast), all Service Keys $K_{Service}$ are protected by the single Session Key $K_{Session}$ for that Epoch, which implements symmetrical cryptography to protect the Service Keys $K_{Service}$. In this manner, Service Keys $K_{Service}$ are protected as long as possible as they are stored in encrypted form on the Client using symmetric cryptography. In some embodiments, the encrypted Session Key $K_{Session}$ is decrypted (using asymmetric cryptography) at substantially the same time as the client is activated, and the decrypted Session Key $K_{Session}$ is cached on the client so that it may be used to decrypt one or more Service Keys $K_{Service}$ (using symmetric cryptography, which is comparably faster than asymmetric cryptography) without having to be decrypted each time.

Figure 6:
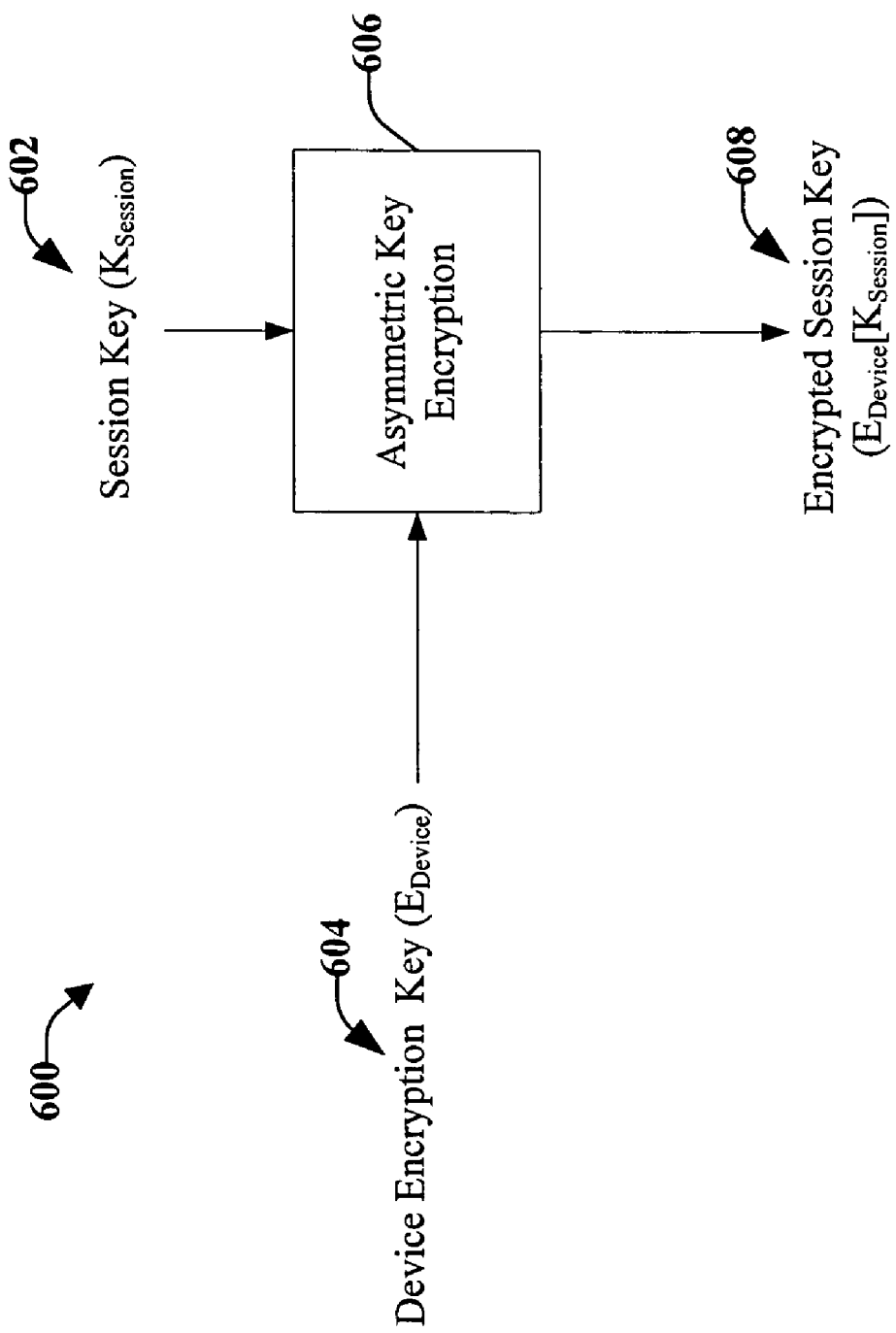
FIG. 6 illustrates an encryption of the session key using a client encryption key.

FIG. 6 illustrates an encryption 600 of the session key using a client encryption key. The Session Key $K_{Session}$ 602 is encrypted by the Client's or Device's Encryption Key $E_{Device}$ 604, which is a public key, for delivery to the Client using an Asymmetric Key Encryption 606. The Encrypted Session Key ($E_{Device}[K_{Session}]$) is delivered and the Client can decrypt Session Key $K_{session}$ 602 using the Client's Decryption Key $D_{Device}$, which is a private key.

Figure 7:
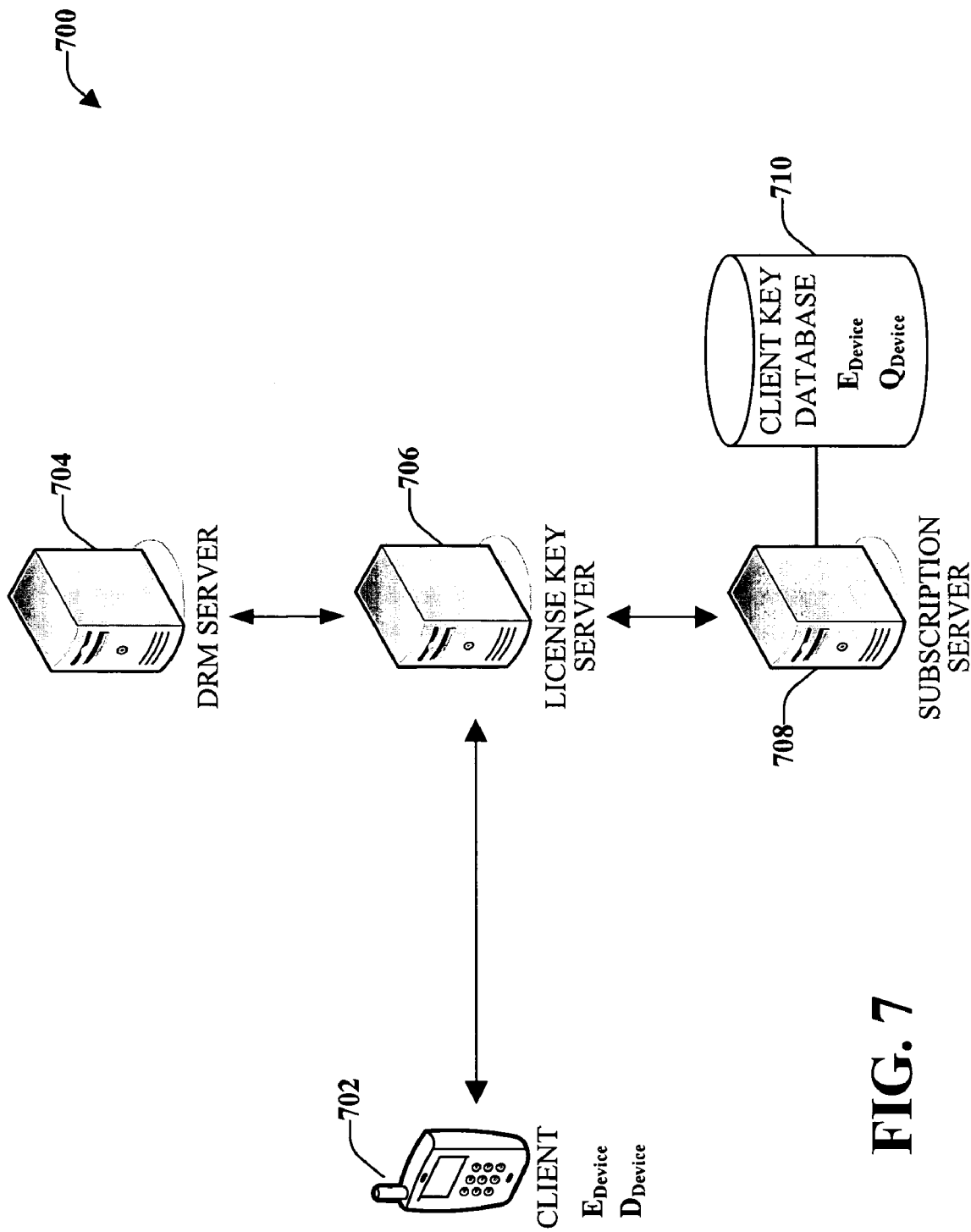
FIG. 7 illustrates an exemplary architecture of a Digital Rights Management (DRM) system.

With reference now to FIG. 7 illustrated is an exemplary architecture of a Digital Rights Management (DRM) system 700. In some embodiments, the layering, or, hierarchy, of the different types of keys is based on a Client Encryption Key $E_{Device}$ encrypting a Session Key $K_{Session}$, which in turn encrypts a Service Key $K_{Service}$. Further, the Service Key $K_{Sevice}$ is used to encrypt a Program Key $K_{Program}$ that is used to protect multimedia content. Thus, the DRM system 700 described herein can employ a hierarchy of keys to protect the digital rights of the content. In some embodiments, Advanced Encryption Standard-Counter (AES-CTR) is used as the symmetric key algorithm, where AES is the cryptographic standard adopted by the National Institute of Standards and Technology (NIST) as US Federal Information Processing Standards (FIPS) PUB 197.

Included in DRM system 700 is a Client 702 (representative of all clients that may be present in system 700), a DRM Server 704, a License Key Server 706, and a Subscription Server 708. In some embodiments, a suite of cryptographic and DRM system modules provides the underlying encryption/decryption and hashing/authentication components to be used at Client 702, DRM Server 704, License Key Server 706, and Subscription Server 708. In addition, the suite of cryptographic and DRM system modules can also provide the license retrieval/download features and secure file-storage features for Client 702, such storage can be associated with a client key database 710.

The functionality provided by the suite of cryptographic and DRM system modules may be broken up into different general categories that can include Public Key Cryptography functionality, Media Cipher functionality, and Authentication functionality. The different categories of functionality interact with one another to provide such functionality as secure file storage, random number generation (RNG), retrieval and storage of keys in an embedded file system (EFS). For example, the Authentication functionality provides the functionality to generate authentication keys, and sign and verify messages at the clients and servers using an authentication key. The Authentication functionality also provides the functionality to store the authentication key in the EFS and retrieve it when needed on Client 702.

In some embodiments, the algorithm used for signing and verification is the HMAC, keyed-hash algorithm, which in some embodiments uses authentication keys in conjunction with Message-Digest version 5 (MD5) hash algorithm to generate the message authentication code. For example, the Authentication key $Q_{Device}$ that is used during client/server communications is a keyed-Hash Message Authentication Code (HMAC), which is a type of message authentication code calculated using a cryptographic hash function in combination with a secret key. As with any MAC, the code may be used to verify both the data integrity and the authenticity of a message at substantially the same time. Any iterative cryptographic hash function, such as Message-Digest algorithm 5 (MD5) or Secure Hash Algorithm 1 (SHA-1), may be used in the calculation of an HMAC; with the resulting MAC algorithm being termed HMAC-MD5 or HMAC-SHA-1, accordingly. The cryptographic strength of the HMAC depends upon the cryptographic strength of the underlying hash function and on the size and quality of the key.

The Media Cipher category of functionality provides functionality to generate Program Keys $K_{Program}$, Service Keys $K_{Service}$, and Session Keys $K_{Session}$, and encrypt and decrypt media and keys using these keys. In some embodiments, the functionality is provided by a cryptography core. All encryption and decryption functions, except for the encryption/decryption of Session Keys $K_{Session}$, can be performed using symmetric cryptography. As discussed herein, the encryption/decryption of Session Keys $K_{Session}$ can be performed using asymmetric cryptography.

Client 702 can generate a public/private key pair as part of an activation process. In some embodiments, the Public Key Cryptography and Authentication categories of functionally are used during a client activation call process, which is the process by which Client 702 registers itself with the servers in DRM system 700. A client activation call process will be discussed in more detail below with reference to FIG. 9.

Figure 8:
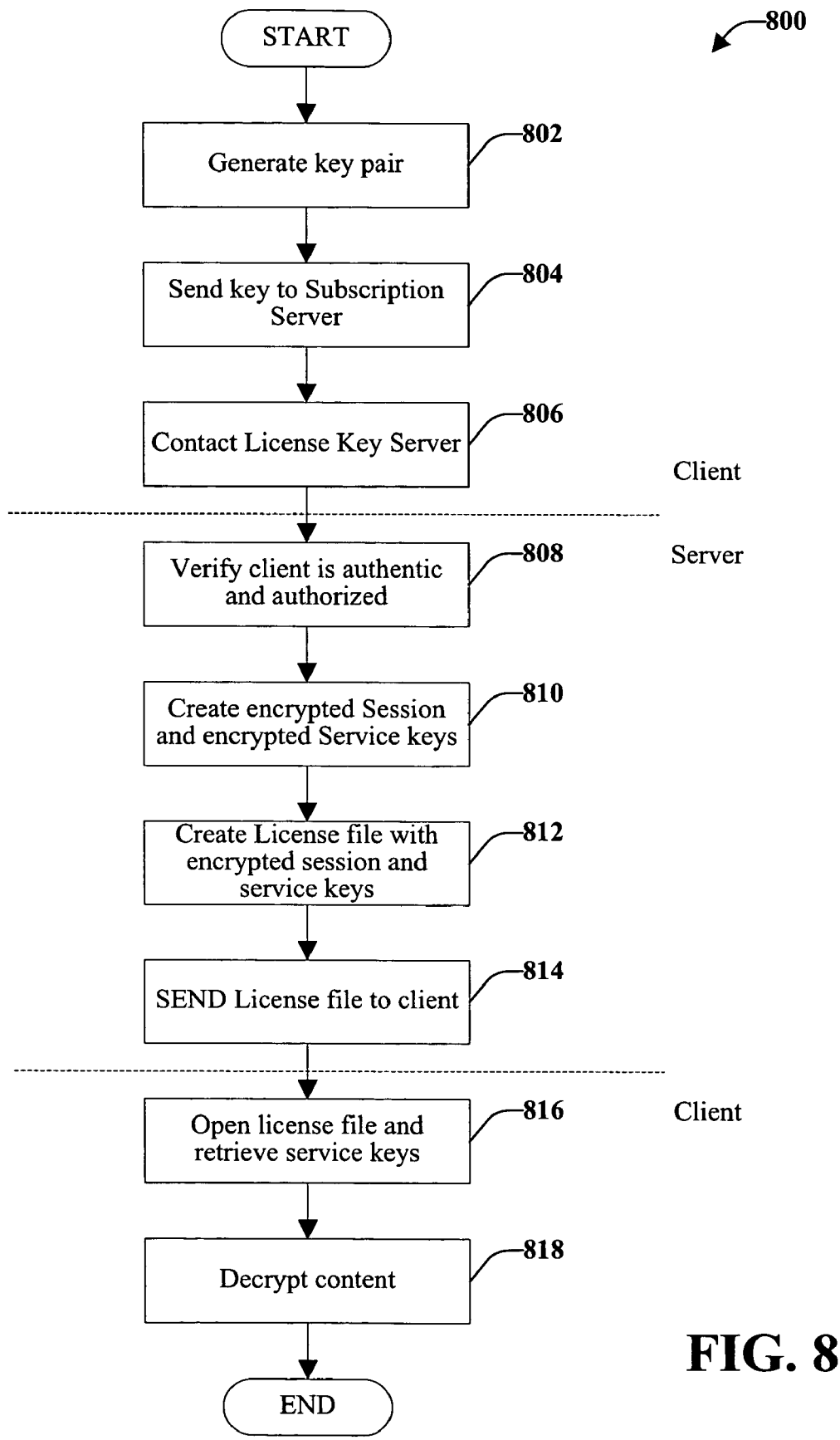
FIG. 8 illustrates a methodology for operation of a DRM System.

FIG. 8 illustrates a methodology 800 for operation of a DRM System. At 802, a public/private key pair is generated. Such generation of the key pair can occur at substantially the same time as the Client is activated and the key pair can be stored on Client. The public key can also be communicated to a Subscription Server. Client may be thought of as the owner of a cryptographic identity through the generation of the public/private key pair. As described herein, the provision of the public key provides a secure channel of communication to Client. Specifically, Public Key Cryptography functionality provides the functionality to generate the Client Encryption Key $E_{Device}$ and Client Decryption Key $D_{Device}$ and stores the keys on Client. In some embodiments, the Client Encryption Key $E_{Device}$ is a public key and the Client Decryption Key $D_{Device}$ is a private key, and these keys comprise a public/private key pair. Thus, the activation process causes these keys to be generated, placed in the EFS and causes the public portion of the Client Key $E_{Device}$ to be populated in a Client Key Database on a Subscription Server.

At 804, Client can contact Subscription Server by sending its Public Key $E_{Device}$ and Subscription Server can send the key to a license server to update Client Key Database. This public portion of the key pair is later used for encrypting the license files or other secret information sent to Client. The activation process also causes a user identifier (UserID) to be assigned to Client. The Client Encryption Key $E_{Device}$ of Client is associated with this particular UserID. In some embodiments, all further communication of Client with License Key Server uses this UserID to retrieve the correct licenses.

After or at substantially the same time as Client has been authenticated, Subscription Server sends a request to DRM server for an Authentication Key $Q_{Device}$ for Client. DRM Server generates the Authentication Key $Q_{Device}$ and returns it to Subscription Server. Subscription Server encrypts the Authentication Key $Q_{Device}$ with $E_{Device}$ and it sends the encrypted Authentication Key $E_{Device}(Q_{Device})$ back to Client. Client, after authenticating the server, stores the encrypted Authentication Key $E_{Device}(Q_{Device})$ into the EFS of Client. Client and the servers now share an authentication key that can be used to authenticate messages from each other. Once Client has been activated, the License file needed to access the services in DRM System may be obtained by Client. In some embodiments, a new License file containing a new set of Service Keys and $K_{Service}$ are obtained at predetermined intervals (e.g., expiration of an Epoch) in order for Client to continue to access the media content.

At 806, License Key Server is contacted by Client for fetching a License file. A process diagram for Client to fetch License Files will be described below with reference to FIG. 10. Once obtained, the License File can be stored locally in Client for later retrieval of the Service Keys $K_{Service}$ and Session Key $K_{Session}$ stored therein. To process the request, at 808, License Key Server can determine if Client is an authentic and authorized Client by contacting a Subscription Server and retrieving the Client Encryption Key $E_{Device}$ and Authentication Key $Q_{Device}$ of Client in addition to a list of services that are subscribed to by Client (ServiceIDs) based on the UserID. Thus, Subscription Server provides client authentication information in the form of the Authentication Key $Q_{Device}$ of Client. Once these keys are retrieved, License Key Server can check the signature using the Client Encryption Key $E_{Device}$ of Client.

If Client is authenticated, then the request for the License file is passed to DRM server. Thus, DRM server is only contacted after Client is authenticated and authorized. Specifically, at 810, the Client Encryption Key $E_{Device}$ of Client and the list of services subscribed to by Client are sent to DRM Server. DRM Server will generate the Session Key $K_{Sesssion}$ for the License File and encrypt all Service Keys $K_{Service}$ for the services subscribed to by Client, as determined by the ServiceIDs, using the Session Key $K_{Session}$. The encryption of the Service Keys $K_{Service}$ is performed by symmetric cryptography. DRM Server will also encrypt the Session Key $K_{Session}$ using the Client Encryption Key $E_{Device}$ of Client. As discussed above, this encryption is performed using asymmetric cryptography.

At 812, the encrypted Session Key $K_{Session}$ and the encrypted Service Keys $K_{Service}$ are stored in the License File by License Key server, along with other header information such as the UserID, EpochID for which the Service Keys $K_{Service}$ are valid, and the Epoch start and end times. Thus, it should be noted that multiple License Files may be generated for a client in a predetermined time period, and each License File can contain the Service Keys $K_{Service}$ that are valid for that particular Epoch, with the Service Keys $K_{Service}$ being encrypted with the Session Key $K_{Session}$ generated for that License File. For example, when a user changes a subscription, Client should acquire a changed set of Service Keys $K_{Service}$ associated with the changed subscribed programming. This changed set of Service Keys $K_{Service}$ is delivered with a new License File that includes a newly generated (and encrypted) Session Key $K_{Session}$.

An exemplary License file is shown below:

---

License Header: UserID, EpochID,
Epoch Start and End Time

---

$E_{Device}$ ($K_{Session}$)
$K_{Session}$ ($K_{Service1}$)
User rights for Service 1
$K_{Session}$ ($K_{Service2}$)
User rights for Service 2
. . .
$K_{Session}$ ($K_{ServiceN}$)
User rights for Service N
Signature on the license.

---

At 814, the License file is sent back to Client by License Key server. In some embodiments, the ultimate result is to provide Client with License File (including the multiple Service Keys $K_{Secrvice}$) and the Session Key $K_{Session}$ (for the Epoch) secured as discussed above.

At 816, to decrypt a program, Client uses the EpochID, ServiceID, ProgramID and encrypted Program Key $K_{Program}$ in the function call to fetch the Key to obtain a decrypted Program Key $K_{Program}$. For example, given an EpochID Y, a ServiceID X, ProgramID Z and an encrypted Program Key $K_{ServiceX}(K_{ProgramZ})$, a decrypted Program Key $K_{programZ}$ can be obtained. A program decryption sequence will be described below with reference to FIG. 11.

At 818, Client decrypts and plays the media content. In some embodiments, the actual symmetric cryptography decryption of the content using the Program Key $K_{Program}$ occurs at substantially the same time as the media is being rendered on the display through a player on Client. The encrypted program file name and the Program Key $K_{Program}$ are then fed to the player using the interface. The media decryption can use a virtual file I/O that provides a virtual file I/O wrapper around the cryptography core implementation and simplifies the decryption process to the player.

Figure 9:
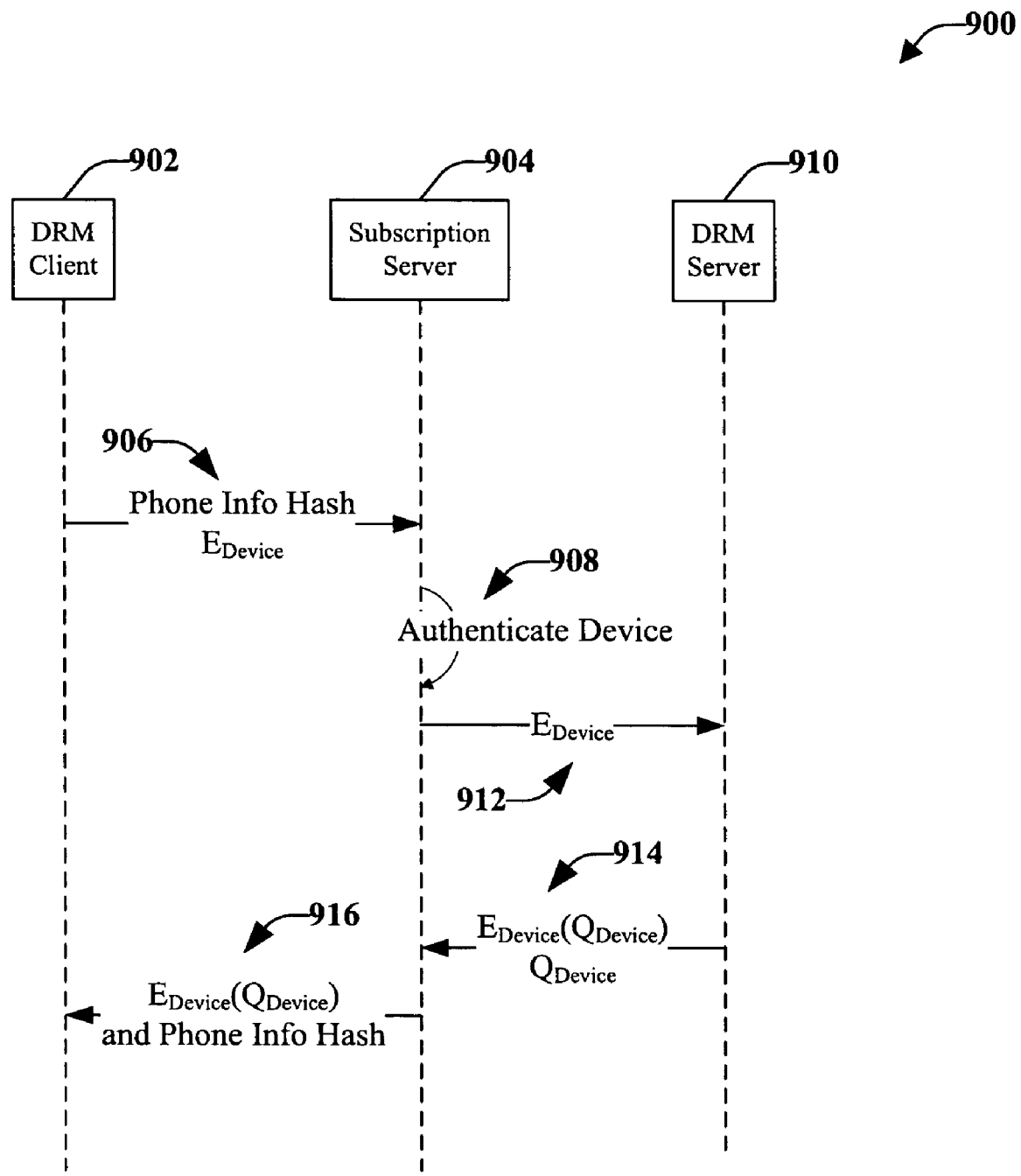
FIG. 9 illustrates a client activation call process flow.

FIG. 9 illustrates a client activation call process flow 900. Public Key Cryptography functionality can provide the functionality to generate Client keys and encrypt and decrypt Session keys using Client keys. In some embodiments, Public Key Cryptography functionality also provides wrapper functions to decrypt encrypted Program keys and to cache a Session key for a particular Epoch. In some embodiments, Client keys are generated using an algorithm based on one described by Ron Rivest, Adi Shamir and Len Adleman (RSA), having both a public key and a private key.

DRM Client 902 communicates a Client Encryption Key $E_{Device}$ to a subscription server 904 through a Phone Info Hash 906, for example. Subscription Server 904 can authenticate Device, at 908, and forward Client Encryption Key $E_{Device}$ to a DRM Server 910, at 912 at substantially the same time as Client 902 is authenticated. DRM Server 910 replies, at 914, with the Client Encryption Key associated with an Authentication Key $E_{Device}(Q_{Device})$ and the Authentication Key $Q_{Device}$. The Client Encryption Key associated with an Authentication Key $E_{Device}(Q_{Device})$ and Phone Info Hash are sent, at 916, to DRM Client 902.

Figure 10:
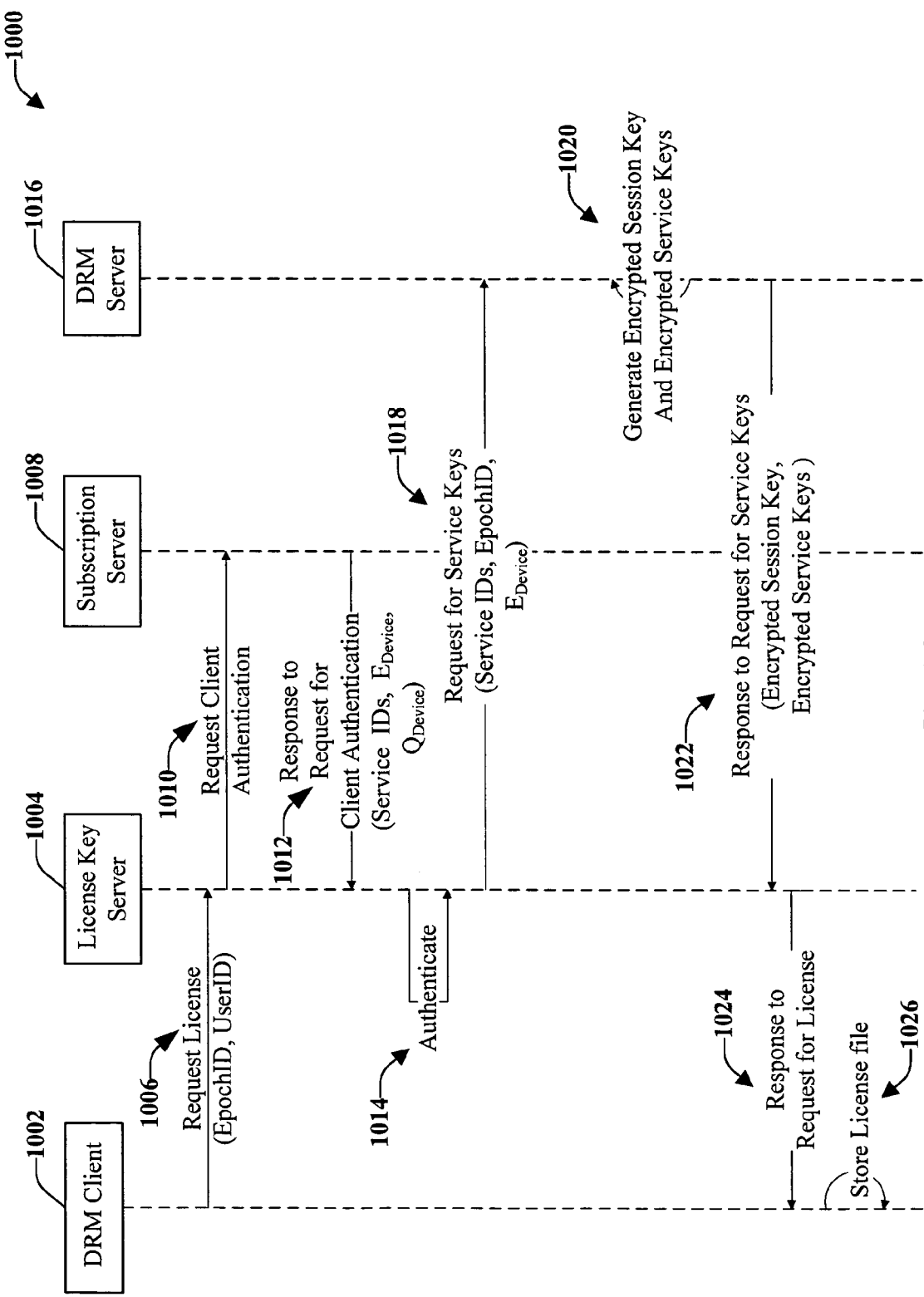
FIG. 10 illustrates a process diagram for a client to fetch license files.

A process diagram 1000 for Client to fetch License files is illustrated in FIG. 10. In some embodiments, DRM Client 1002 fetches License files from License Key Server 1004 by providing the License Key Server with the identification of the user (e.g., UserID) and the identification of the epoch (e.g., EpochID) for which Client 1002 desires to fetch the License file. The user identification and epoch are sent, at 1006, with the license request. In addition, Client 1002 can provide License Key Server 1004 with the Authorization Key $Q_{Device}$ of Client 1002 signed using the Client Decryption Key $D_{Device}$ of Client 1002.

License Key Server 1004 requests client authentication from Subscription Server 1008, at 1010. Subscription Server 1008 can respond to the request for Client Authentication (e.g., Service IDS, $E_{Device}$, $Q_{Device}$), at 1012. Client 1002 is authenticated, at 1014, and a request for service keys (e.g., Service IDS, EpochID, $E_{Device}$) is sent to DRM Server 1016, at 1018.

Encrypted Session Key $K_{Session}$ and encrypted Service Keys $K_{Service}$ are generated, at 1020, by Server 1016. At 1022, a response to the request for service keys (encrypted Session Key $K_{Session}$, encrypted Service Keys $K_{Service}$) is sent to License Key Server 1004. A response to the request for license is sent, at 1024, to Client 1002. Once obtained, the License file can be stored, at 1026, locally in Client 1002 for later retrieval of the Service Keys $K_{Service}$ and Session Key $K_{Session}$ stored therein.

Figure 11:
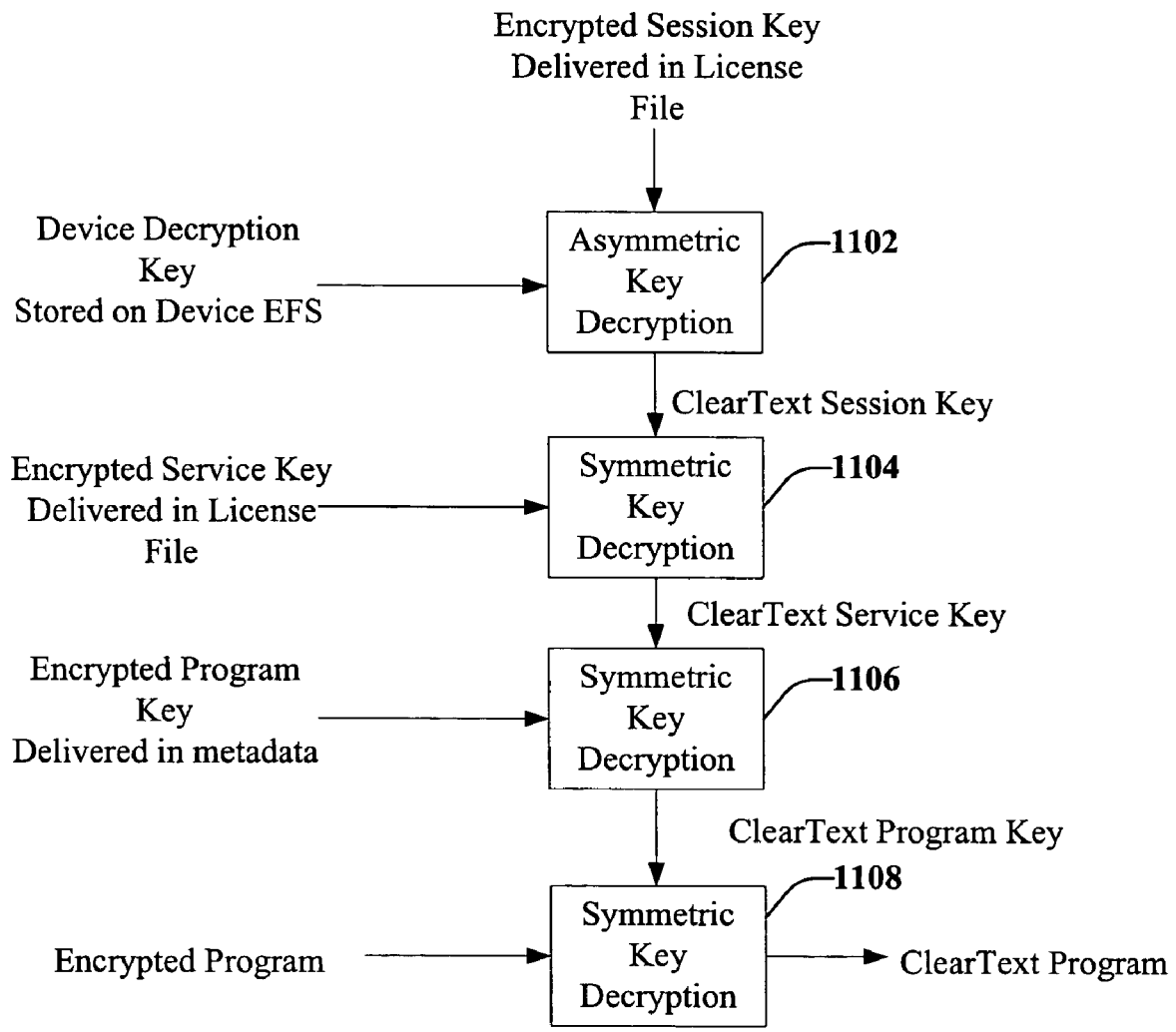
FIG. 11 shows a program decryption sequence using the various keys.

FIG. 11 illustrates a program decryption sequence 1100 using the various keys, where, internally, Client assumes that the License required for the Epoch associated with EpochID has already been fetched. At 1102, Client uses the previously stored Client Decryption Key $D_{Device}$ to decrypt the Session Key $E_{Device}(K_{Session})$ in the License File, the decrypted (ClearText) Session Key $K_{Session}$ to decrypt the Service key for Service X $K_{Session}(K_{SericeX})$ in the License file, at 1104, and the decrypted Service key for Service X $K_{ServiceX}$ to decrypt the encrypted Program key for Program Z $K_{ServiceX}$ ($K_{ProgramZ}$), at 1106. It then returns the Program Key $K_{ProgramZ}$ in the clear for decryption of the Program, at 1108.

Thus, in some embodiments, in order to decrypt the program at Client, Client assumes that the user is activated within the system and has the proper client key files (e.g., the Client Encryption Key $E_{Device}$ and the Client Decryption Key $D_{Device}$). It also assumes that the License File for the particular Epoch has been downloaded to Client. Should these requirements not hold true, DRM system can report errors. Should different key files (other than the ones generated when Client was activated within the system) be present on Client the decryption will take place without errors but the output data will be not be useful data.

Figure 12:
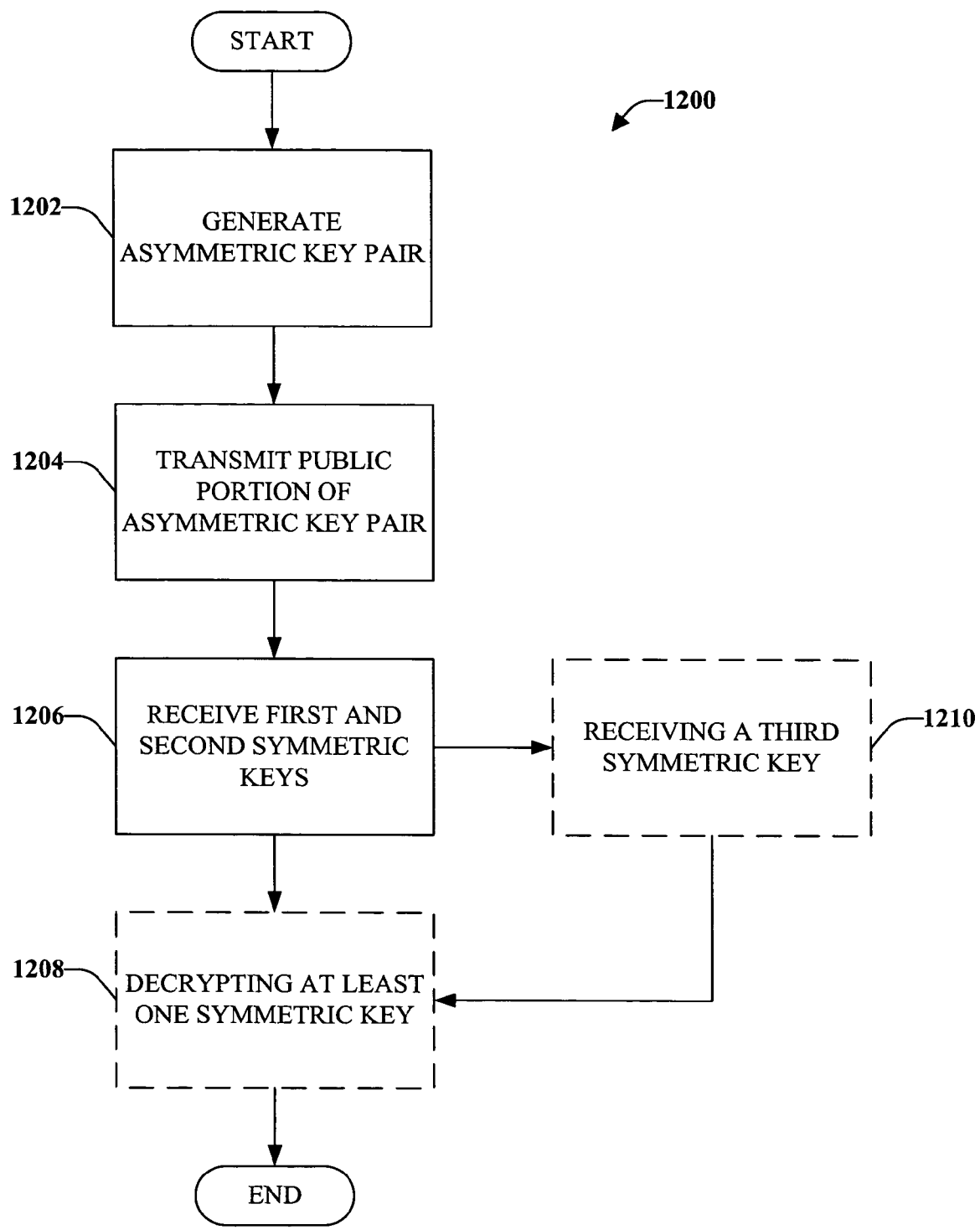
FIG. 12 illustrates a methodology for performing digital rights management on a client for a multitude of content.

A methodology 1200 for performing digital rights management on a client for a multitude of content is illustrated in FIG. 12. While, for purposes of simplicity of explanation, the methodologies disclosed herein are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 1200 starts, at 1202, where an asymmetric key pair is generated, for example, as part of an activation process. Generation of the asymmetric key pair may include generating a public key or public portion and a private key or private portion. At 1204, a public portion of the asymmetric key pair is transmitted to a server, digital rights management authority, license server, or the like (refereed to herein as server). The server can encrypt a first symmetric key and a second symmetric key and transmit the encrypted symmetric keys to the client. At 1206, the first symmetric key and second symmetric key are received at the client.

A first symmetric key may be encrypted using a public portion of the asymmetric key pair. In some embodiments, the first symmetric key may be encrypted with a decryption scheme that is valid for predetermined interval (e.g., time, or other scheme for measuring an interval). A second symmetric key can be associated with a multitude of content. In some embodiments, the second symmetric key can be encrypted with the first symmetric key.

In some embodiments, method 1200 can continue, at 1208, where the first symmetric key, the second symmetric key, or both symmetric keys are decrypted. For example, the first symmetric key may be decrypted using the private portion of the asymmetric key pair. If the second symmetric key is encrypted with the first symmetric key, decryption of the second symmetric key may be based on the first symmetric key.

Receiving a third symmetric key, at 1210, can be included in method 1200 in accordance with some embodiments. The third symmetric key can be associated with the multitude of content. The server can encrypt the third symmetric key with the first symmetric key. Method 1200 continues, at 1208, where at least the third symmetric key is decrypting based on the first symmetric key.

In accordance with some embodiments, the first symmetric key and the second symmetric key may be contained in a license file. If contained in a license file, decrypting the second symmetric key that is based on the first symmetric key, at 1208, includes retrieving the second symmetric key from the license file and decrypting the second symmetric key using symmetric cryptography. In some embodiments, a first content in a multitude of content and the second symmetric key are associated with a third symmetric key. The third symmetric key can be decrypted using the decrypted second symmetric key and the first content can be decrypted from the multitude of content associated with the third symmetric key.

Figure 13:
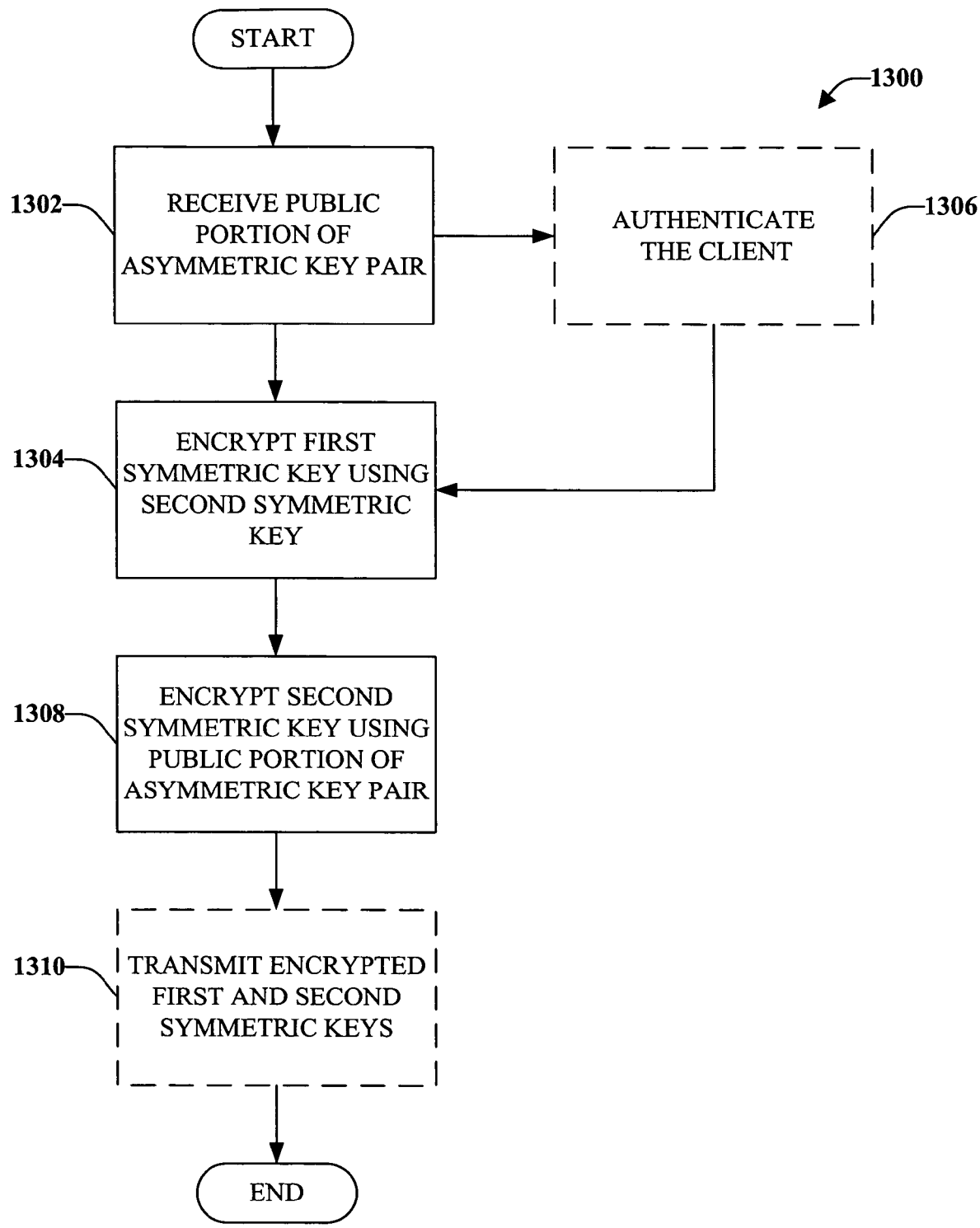
FIG. 13 illustrates a methodology for performing digital rights management on a server for a multitude of content.

FIG. 13 illustrates a methodology 1300 for performing digital rights management on a server for a multitude of content. Method 1300 starts at 1302, where a public portion of an asymmetric key pair is received from a client. At 1304, a first symmetric key is encrypted using a second symmetric key. The first symmetric key can be associated with a multitude of content. Encrypting the first symmetric key can include retrieving a multitude of service identifiers (IDs) associated with a multitude of content subscribed to by the client. The first symmetric key can be retrieved based on the retrieved multitude of service IDs. In some embodiments, before encrypting the first symmetric key, the client is authorized, at 1306. The method 1300 continues at 1308, where the second symmetric key is encrypted using the public portion of the asymmetric key pair. In accordance with some embodiments, the first and second symmetric keys can be transmitted to the client, at 1310.

Figure 14:
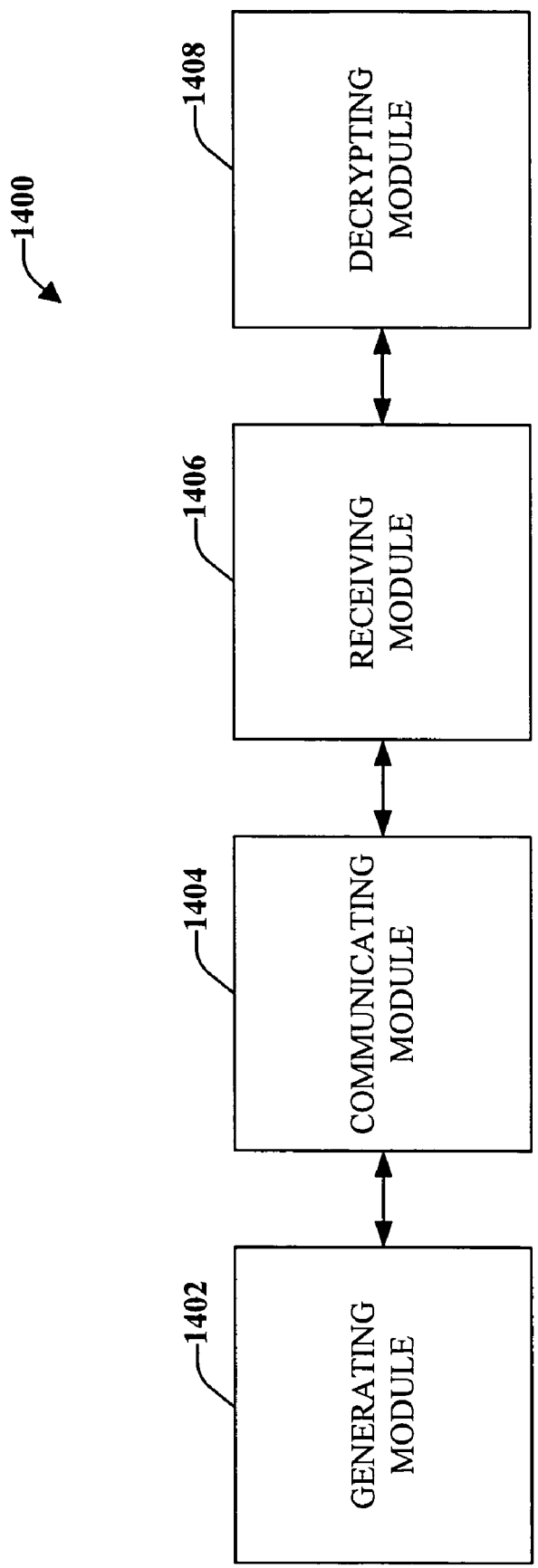
FIG. 14 illustrates a system for performing digital rights management on a client for a multitude of content.

With reference now to FIG. 14, illustrated is a system 1400 for performing digital rights management on a client for a multitude of content. System 1400 is represented as functional blocks, which can be functional blocks that represent functions implemented by a processor, software or combination thereof (e.g., firmware).

System 1400 includes a generating module 1402 that can be configured to generate a public key and a private key. The keys can be generated utilizing asymmetric cryptography. Also included is a communicating module 1404 that can be configured to communicate the public key to a license server with a request for a license file. A receiving module 1406 can be configured to receive the requested license file. The license file can be received from a server, for example. Also included is a decrypting module 1408 that can be configured for decrypting a multimedia content based in part on header information contained in the license file. In accordance with some embodiments, system 1400 can also include a storage module (not shown) that can be configured to store a service key contained in the license file. In accordance with some embodiments a rendering module (not shown) that can be configured to render a media on a display screen at substantially a same time as the multimedia content is decrypted in included in system.

Figure 15:
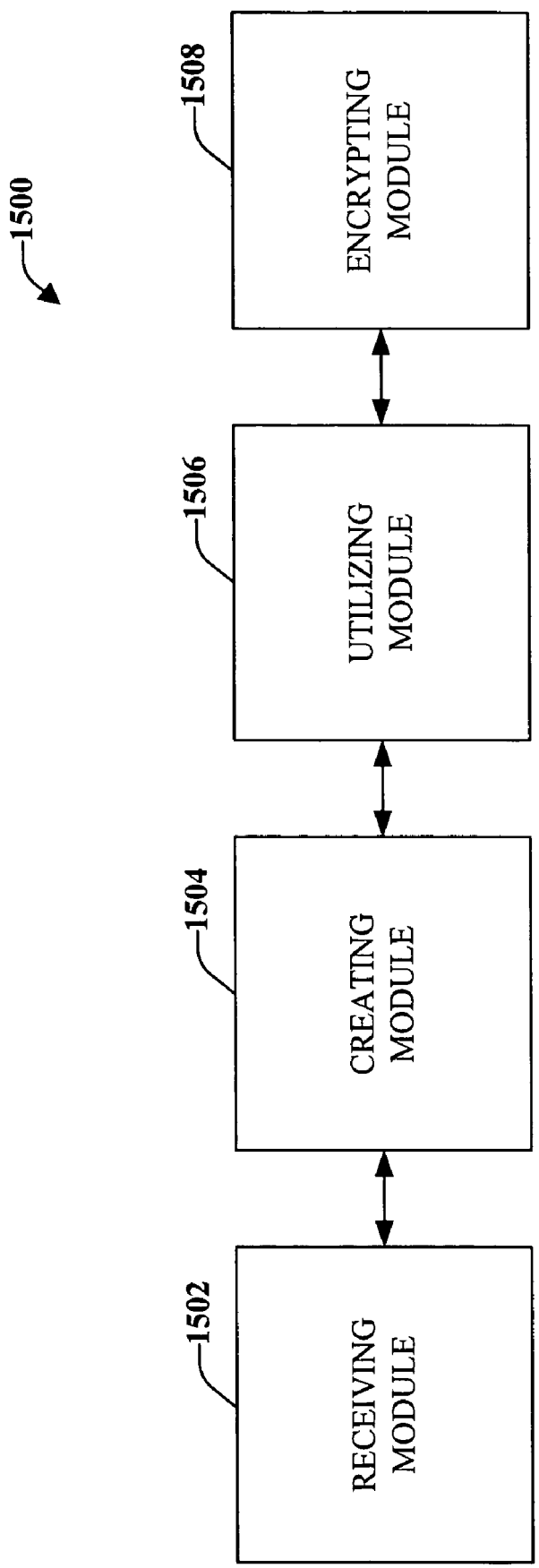
FIG. 15 illustrates a system for performing digital right management on a server for a multitude of content.

FIG. 15 illustrates a system 1500 for performing digital right management on a server for a multitude of content. System 1500 is represented as functional blocks, which can be functional blocks that represent functions implemented by a processor, software or combination thereof (e.g., firmware).

System 1500 includes a receiving module 1502 that can be configured to receive at least a portion of an asymmetric key pair from a client. The received portion can be a public portion. Also included is a creating module 1504 that can be configured to create a first symmetric key and at least a second symmetric key. The first symmetric key can be associated with a plurality of content. System 1500 can further include a utilizing module 1506 that can be configured to utilize the first symmetric key to encrypt the at least a second symmetric key. Also included is an encrypting module that can be configured to encrypt the second symmetric key with the at least a portion of the asymmetric key pair. In accordance with some embodiments is an authentication module (not shown) that can be configured to authenticate a client before creating the first symmetric key and the at least a second symmetric key. In accordance with some embodiments is a transmitting module (not shown) that can be configured to transmit the encrypted first symmetric key and encrypted second symmetric key to a client.

Figure 16:
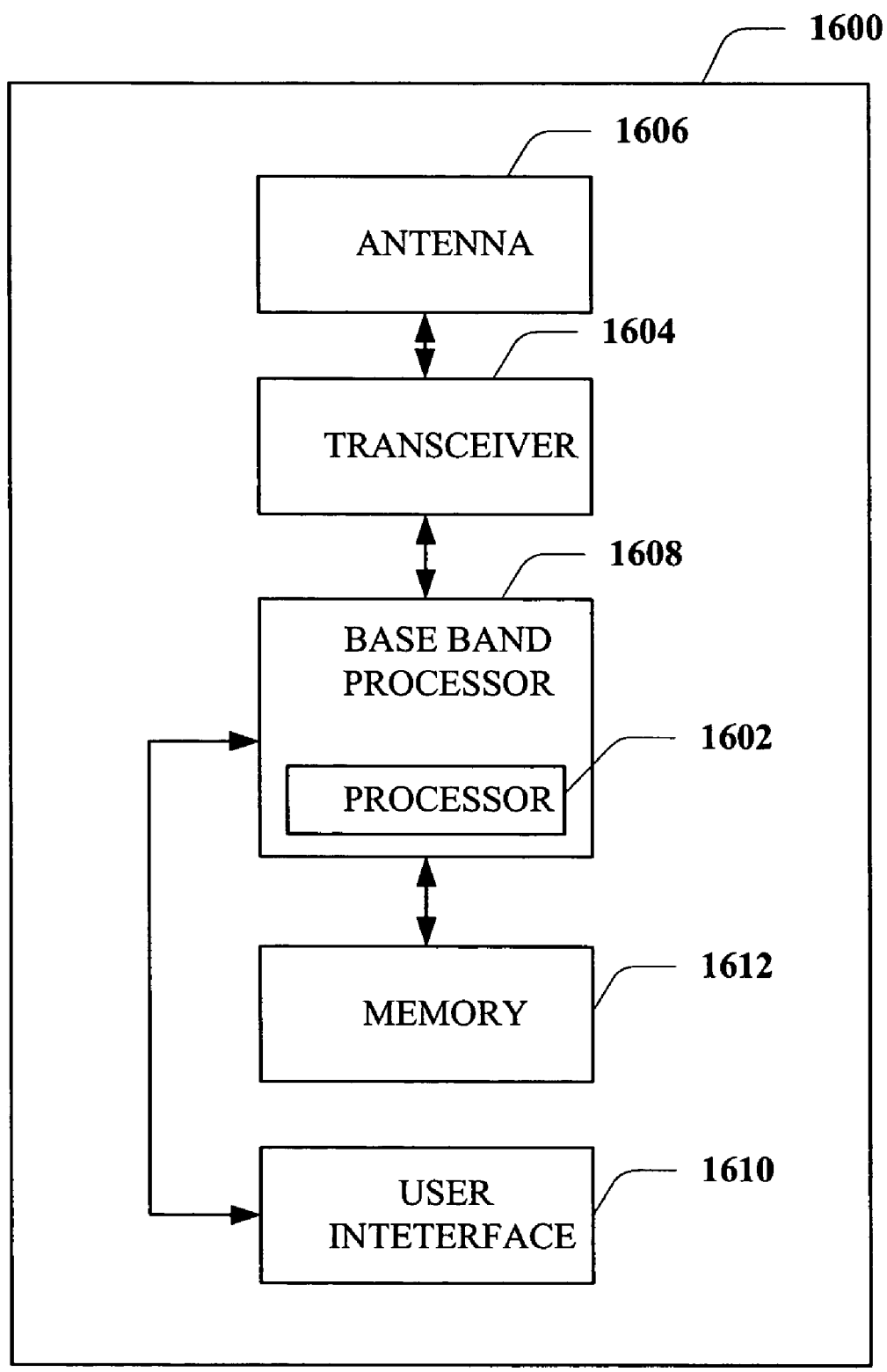
FIG. 16 illustrated is a conceptual block diagram of a possible configuration of a wireless device or terminal.

With reference now to FIG. 16, illustrated is a conceptual block diagram of a possible configuration of a wireless device or terminal 1600. As those skilled in the art will appreciate, the precise configuration of the terminal 1600 may vary depending on the specific application and the overall design constraints. Processor 1602 can implement the systems and methods disclosed herein.

Terminal 1600 can be implemented with a front-end transceiver 1604 coupled to an antenna 1606. The front-end transceiver 1604 is configured to receive a data communication. A base band processor 1608 can be coupled to the transceiver 1604. The base band processor 1608 can be implemented with a software-based architecture, or other types of architecture. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal 1600 can also include various user interfaces 1610 coupled to the base band processor 1608. User interfaces 1610 can include a keypad, mouse, touch screen, display, ringer, vibrator, audio speaker, microphone, camera, and/or other input/output devices.

The base band processor 1608 comprises a processor 1602. In a software-based implementation of the base band processor 1608, the processor may be a software program running on a microprocessor. However, as those skilled in the art will readily appreciate, the processor 1602 is not limited to this embodiment, and may be implemented by a variety of means known in the art, including hardware configurations, software configuration, or combination thereof, which is capable of performing the various functions described herein. The processor 1602 can be coupled to memory 1612 for the storage of data. The memory 1612 is configured to store the program data received during a manufacturing and/or test process and the processor 1602 or 1608 is configured to be programmed with the program data.

The various embodiments (e.g., in connection with efficient key hierarchy for delivery of multimedia content and digital rights management) can employ various AI-based schemes for carrying out various aspects thereof. For example, a process for validating and invalidating various keys for one or more user through an automatic classifier system and process. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more embodiments can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to create keys, which types of keys to create, etc. The criteria can include, but is not limited to, the amount of data or content to access, the type of content, the importance of the content, etc.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of hardware, processors and systems known by one of ordinary skill in the art. For example, the general requirement for the client to operate as described herein is that the client has a display to display content and information, a processor to control the operation of the client and a memory for storing data and programs related to the operation of the client. In some embodiments, the client is a cellular phone. In some embodiments, the client is a handheld computer having communications capabilities. In yet another embodiment, the client is a personal computer having communications capabilities. In addition, hardware such as a GPS receiver may be incorporated as necessary in the client to implement the various embodiments described herein. Further, although terms such as "client" and "server" has been used herein to refer to specific devices and/or entities, these terms should not be construed to be limiting in anyway but are used to provide a clearer explanation of the embodiments contained herein. Thus, a device or entity that is a "client" in one sequence of transaction or scenario may be considered a "server" in another sequence of transactions or scenario.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for performing digital rights management on a client for a plurality of content, comprising:
    generating, at the client, an asymmetric key pair that comprises a public portion and a private portion;
    transmitting, by the client, the public portion of the asymmetric key pair to a server; and
    receiving, by the client, a first symmetric key, a second symmetric key, and a third symmetric key generated by the server, wherein the first symmetric key is encrypted using the public portion of the asymmetric key pair, the second symmetric key is associated with a plurality of content, and the third symmetric key is associated with a first content in the plurality of content.

2. The method of claim 1, further comprising decrypting the first symmetric key using the private portion of the asymmetric key pair.

3. The method of claim 1, further comprising decrypting the second symmetric key based on the first symmetric key, wherein the second symmetric key is encrypted with the first symmetric key.

4. The method of claim 1, further comprising:
    retrieving the second symmetric key from a license file, wherein the first symmetric key and the second symmetric key are contained in the license file; and,
    decrypting the second symmetric key using symmetric cryptography.

5. The method of claim 4, further comprising:
    decrypting the third symmetric key using the decrypted second symmetric key; and
    decrypting the first content from the plurality of content associated with the third symmetric key.

6. The method of claim 1, further comprising decrypting the third symmetric key based on the first symmetric key, wherein the third symmetric key is encrypted with the first symmetric key.

7. The method of claim 1, wherein generating the asymmetric key pair comprises generating a public key and a private key.

8. The method of claim 1, further comprising encrypting the first symmetric key with a decryption scheme valid for a predetermined interval.

9. An apparatus that facilitates digital rights management, comprising:
    a processor that executes instructions for generating an asymmetric key pair and selectively transmits at least a first portion of the asymmetric key pair to a server, the processor further executing instructions for receiving, from the server, a first symmetric key, a second symmetric key, and a third symmetric key that are generated by the server, wherein the first symmetric key is encrypted using the at least a first portion of the asymmetric key pair, the second symmetric key is associated with a plurality of content, and the third symmetric key is associated with a first content in the plurality of content; and
    a memory that stores information related to at least a second portion of the asymmetric key pair generated by the processor.

10. The apparatus of claim 9, the processor further executes instructions for decrypting the first symmetric key using a second portion of the asymmetric key pair.

11. A method for performing digital rights management on a server for a plurality of content comprising:
    receiving, at the server, a public portion of an asymmetric key pair from a client;
    generating, by the server, a first symmetric key and a second symmetric key;
    encrypting the first symmetric key using the second symmetric key, wherein the first symmetric key is associated with a plurality of content; and
    encrypting the second symmetric key using the public portion of the asymmetric key pair,
    wherein encrypting the first symmetric key comprises:
        retrieving a plurality of service identifiers associated with the plurality of content subscribed to by the client; and
        retrieving the first symmetric key based on the retrieved plurality of service identifiers.

12. The method of claim 11, further comprising transmitting the encrypted first symmetric key and the second symmetric key to the client.

13. The method of claim 11, further comprising authenticating the client before encrypting the first symmetric key.

14. An apparatus that facilitates delivery of multimedia content, comprising:
    a processor that executes instructions for generating an encrypted first symmetric key and at least a second encrypted symmetric key associated with a request for delivery of multimedia content, executes instructions for receiving at least a portion of an asymmetric key pair from a client, and executes instructions for encrypting the first symmetric key, associated with plurality of content, with the second symmetric key and encrypting the second symmetric key with at least a portion of the asymmetric key pair; and
    a memory that stores information related to at least one of the first symmetric key and the at least a second symmetric key generated by the processor,
    wherein executing instructions for encrypting the first symmetric key comprises executing instructions for retrieving a plurality of service identifiers associated with the plurality of content subscribed to by the client and executing instructions for retrieving the first symmetric key based on the retrieved plurality of service identifiers.

15. An apparatus that facilitates creation of a key hierarchy for delivery of content, comprising:
    means for receiving, from a client, at least a portion of an asymmetric key pair generated by the client;
    means for creating, via a hardware processor, a first symmetric key and at least a second symmetric key;
    means for utilizing the at least a second symmetric key to encrypt the first symmetric key; and
    means for encrypting the second symmetric key with the at least a portion of the asymmetric key pair,
    wherein the means for utilizing the at least second symmetric key to encrypt the first symmetric key comprises:
        means for retrieving a plurality of identifiers associated with the plurality of content subscribed to by the client; and
        means for retrieving the first symmetric key based on the retrieved plurality of service identifiers.

16. The apparatus of claim 15, the at least a portion of the asymmetric key pair is a public portion and the first symmetric key is associated with a plurality of content.

17. The apparatus of claim 15, further comprising means for authenticating a client before creating the first symmetric key and the at least a second symmetric key.

18. The apparatus of claim 15, further comprising means for transmitting the encrypted first symmetric key and encrypted second symmetric key to a client.

19. A non-transitory computer-readable medium having stored thereon computer-executable instructions for digital rights management, the instructions comprising:
   accepting, from a client, a request for access to multimedia content, the request comprising at least a portion of an asymmetric key pair generated by the client;
   creating a first symmetric key and at least a second symmetric key;
   encrypting the first symmetric key with the second symmetric key;
   associating the second symmetric key with the multimedia content; and
   sending the first symmetric key and the second symmetric key to a client,
   wherein encrypting the first symmetric key comprises:
      retrieving a plurality of service identifiers associated with the plurality of content subscribed to by the client; and
      retrieving the first symmetric key based on the retrieved plurality of service identifiers.

20. The non-transitory computer-readable medium of claim 19, the instructions further comprising encrypting the second symmetric key with the at least a portion of the asymmetric key pair.

21. The non-transitory computer-readable medium of claim 19, the instructions further comprising maintaining information relating the first symmetric key and the at least a second symmetric key in a storage media.

22. A processor that executes computer-executable instructions for digital rights management, the instructions comprising:
   receiving a request from an authenticated client for a license file, the request comprising a client encryption key and a list of subscribed services;
   generating an encrypted session key for the requested license file;
   creating at least one encrypted service key associated with the subscribed services;
   creating at least one encrypted session key with the client encryption key; and
   storing the encrypted service key and the at least one encrypted session key in the requested license file.

23. The processor of claim 22, further comprising sending the requested license file to the authenticated client.

24. The processor of claim 22, generating an encrypted session key is performed by symmetric cryptography.

25. The apparatus of claim 9, wherein the processor is further configured to decrypt the second symmetric key based on the first symmetric key, wherein the second symmetric key is encrypted with the first symmetric key.

26. The apparatus of claim 9, wherein the processor is further configured to retrieve the symmetric key from a license file, wherein the first symmetric key and the second symmetric key are contained in the license file, and to decrypt the second symmetric key using symmetric cryptography.

27. The apparatus of claim 26, wherein the processor is further configured to decrypt the third symmetric key using the decrypted second symmetric key, and to decrypt the first content from the plurality of content associated with the third symmetric key.

28. The apparatus of claim 9, wherein the processor is further configured to decrypt the third symmetric key based on the first symmetric key, wherein the third symmetric key is encrypted with the first symmetric key.

29. The apparatus of claim 9, wherein the asymmetric key pair comprises a public key and a private key.

30. The apparatus of claim 9, wherein the processor is further configured to encrypt the first symmetric key with a decryption scheme valid for a predetermined interval.

31. The apparatus of claim 14, wherein the processor is further configured to execute instructions for transmitting the encrypted first symmetric key and the second symmetric key to the client.

32. The apparatus of claim 14, wherein the processor is further configured to execute instructions for authenticating the client before encrypting the first symmetric key.

33. The apparatus of claim 9, the processor further executes instructions for decrypting the third symmetric key using the decrypted second symmetric key and decrypting the first content from the plurality of content associated with the third symmetric key.

34. The method of claim 11, further comprising maintaining information relating the first symmetric key and the at least a second symmetric key in a storage media.

35. The computer-readable medium of claim 19, the instructions further comprising authenticating the client before encrypting the first symmetric key.

* * * * *